US005784885A

United States Patent [19]

Ishihama et al.

[11] Patent Number: 5,784,885

[45] Date of Patent: Jul. 28, 1998

[54] PRESSURIZED FLUID SUPPLY SYSTEM

[75] Inventors: Kazuyoshi Ishihama; Kazunori Ikei; Kazuo Uehara, all of Kanagawa, Japan

[73] Assignee: Kabushiki Kaisha Komatsu Seisakusho, Japan

[21] Appl. No.: 600,505

[22] Filed: Feb. 13, 1996

Related U.S. Application Data

[62] Division of Ser. No. 411,817, Apr. 10, 1995, Pat. No. 5,651,390.

[30] Foreign Application Priority Data

| | | | |
|---|---|---|---|
| Oct. 23, 1992 | [JP] | Japan | U.M. HEI4-74091 |
| Oct. 23, 1992 | [JP] | Japan | U.M. HEI4-74110 |
| Oct. 23, 1992 | [JP] | Japan | HEI 4-285777 |
| Oct. 23, 1992 | [JP] | Japan | HEI 4-285803 |
| Oct. 29, 1992 | [JP] | Japan | U.M. HEI4-75260 |
| Oct. 29, 1992 | [JP] | Japan | U.M. HEI4-75261 |
| Nov. 4, 1992 | [JP] | Japan | U.M. HEI4-76058 |
| Nov. 11, 1992 | [JP] | Japan | U.M. HEI4-77615 |

[51] Int. Cl.[6] .......... F16D 31/02

[52] U.S. Cl. .......... 60/423; 60/431; 91/446; 417/34

[58] Field of Search .......... 60/431, 423; 91/446; 417/34

[56] References Cited

U.S. PATENT DOCUMENTS

| | | | |
|---|---|---|---|
| 3,447,556 | 6/1969 | Howeth | 417/34 X |
| 4,523,431 | 6/1985 | Budzich | 417/34 X |
| 4,635,440 | 1/1987 | Kropp | 60/431 X |
| 4,716,727 | 1/1988 | Kotter | 60/423 |
| 4,733,533 | 3/1988 | Deininger et al. | 60/423 X |
| 4,862,691 | 9/1989 | Peschel | 60/431 X |
| 4,864,994 | 9/1989 | Myers | 60/431 |
| 5,237,908 | 8/1993 | Kropp | 91/446 X |

FOREIGN PATENT DOCUMENTS

| | | |
|---|---|---|
| 60-11706 | 1/1985 | Japan . |
| 330678 | 3/1991 | Japan . |
| 3-111656 | 11/1991 | Japan . |
| 4-244604 | 9/1992 | Japan . |
| 4-244605 | 9/1992 | Japan . |
| 5-30503 | 4/1993 | Japan . |
| 5-96503 | 12/1993 | Japan . |

*Primary Examiner*—Hoang Nguyen
*Attorney, Agent, or Firm*—Ronald P. Kananen

[57] ABSTRACT

A direction control valve is formed by providing a main spool for establishing and blocking communication between an inlet port, first and second actuator ports and first and second tank ports. A pressure compensation valve comprising a check valve portion and pressure reduction portions is provided for compensating the pressurized fluid with a load pressure and supplying it to the inlet port. A plurality of valve blocks are connected with communicating respective first and second tank ports and respective pump ports, and either one of pump port is connected to a main port. In either case, the pump port is connected to the main input port to any one of the first and second tank ports is connected to the main tank port.

4 Claims, 21 Drawing Sheets

PRESSURIZED FLUID SUPPLY SYSTEM

This application is a division of application Ser. No. 08/411,817 filed Apr. 10, 1995 now U.S. Pat. No. 5,651,390.

FIELD OF THE INVENTION

The present invention relates to a hydraulic pressure supply system for distributing a pressurized fluid discharged from one or more hydraulic pumps to a plurality of actuators. More specifically, the invention relates to a pressurized fluid supply system for distributing a pressurized fluid discharged from one or more hydraulic pumps to left and right hydraulic motors for a traveling and a work implement cylinder.

BACKGROUND ART

Japanese Unexamined Patent Publication (Kokai) No. Showa 60-11706 discloses a pressurized fluid supply system of the type set forth above. FIG. 1 shows the pressurized fluid supply system disclosed in the above-identified publication. A plurality of pressure compensation valves 3 and 13 are connected in parallel to a discharge line pipe 2 of a hydraulic pump 1. Discharge pipes 4 and 14 of respective pressure compensation valves 3 and 13 are provided with direction control valves 5 and 15. The outlet sides of the direction control valves 5 and 15 are connected to actuators 6 and 16. The pressure compensation valves 3 and 13 are constructed to be biased in a valve opening direction by a pump discharge pressure and outlet pressures of the direction control valves 5 and 15 and to be biased in a valve closing direction by the inlet pressures of the direction control valves and the highest load pressure. With the shown pressurized fluid supply system, it becomes possible to supply pressurized fluid discharged from the pump to respective actuators at a predetermined distribution ratio when a plurality of direction control valves 3 and 13 are operated simultaneously.

However, in the above-mentioned pressurized fluid supply system, it becomes essential to provide a shuttle valve 7 for comparing load pressures of respective actuators and supplying the highest load pressure to the pressure compensation valves. Furthermore, the number of shuttle valves required becomes one less than the number of actuators. Therefore, the number of necessary shuttle valves is inherently increased according to an increasing number of the actuators to be supplied the pressurized fluid to be a cause of increased costs.

On the other hand, in the pressurized fluid supply system illustrated in FIG. 1, assuming that the load pressure of the actuator 6 is higher than the load pressure of the actuator 16 among the load pressures generated upon actuation of two actuators 6 and 16, a pressure in a passage 8 is introduced into a passage 9 via the shuttle valve 7 as the maximum load pressure. Subsequently, if the load pressure fluctuates and the load pressure of the actuator 16 becomes higher than the load pressure of the actuator 6, the shuttle valve 7 is switched to connect the passage 9 and a passage 18. Upon this switching, due to blow off of the shuttle valve 7, the pressure in the passage 18 drops, and the pressure in the other passage 8 is blocked. As a result, upon switching of the shuttle valve 7, the actuator 16 transitively causes natural drop and the actuator 6 is transitively accelerated.

In order to solve the above-mentioned problem, the applicant has previously proposed a pressurized fluid supply system, in which a plurality of direction control valves 22 are provided in a discharge passage 21 of a hydraulic pump

20, and a pressure compensation valve 25 constituted of a check valve 23 and a pressure reduction valve 24 is provided at the inlet side of each direction control valve, as shown in FIG. 2.

In such pressurized fluid supply system, since a plurality of direction control valves and a plurality of pressure compensation valves are provided, when these are combined, the overall system becomes bulky to require large installation space. Therefore, it becomes difficult to provide installation space for small size construction machines.

SUMMARY OF THE INVENTION

It is an object of the present invention to solve the above-mentioned problem in the prior art and thus to provide a pressurized fluid supply system which can prevent transitive natural drop of an actuator upon switching between load pressures and can reduce necessary space for permitting down-sizing of the overall system.

In order to accomplish the above-mentioned and other objects, according to the first aspect of the invention, a direction control valve assembly comprises:

- a direction control valve formed by providing a main spool in a valve block for establishing and blocking communication between an inlet port, first and second actuator ports and first and second tank ports;
- a pressure compensation valve formed with a check valve portion and a pressure reduction valve portion provided in the valve bock and supplying a pressurized fluid in a pump port to an inlet port with pressure compensation based on a load pressure;
- a plurality of the valve blocks being connected with communicating respective of the first and second tank ports and respective of the pump ports, and the pump port of any one of the valve blocks being connected to a main inlet port and the first and second tank ports of any one of the valve blocks being connected to a main tank port.

It should be noted that, in this case, it is possible that the direction control valve is constructed in such a manner that the valve block is formed with a spool bore, a check valve receptacle bore, and a pressure reduction valve receptacle bore, the valve block being further formed with the inlet port, the first and second load pressure detecting ports the first and second actuator ports and the first and second tank ports opening to the spool bore, and the main spool is disposed in the spool bore for selectively establishing and blocking communication between the ports;

- the check valve portion is constructed in such a manner that the valve block is formed with a pump port opening to the check valve receptacle bore and a fluid passage communicating the check valve receptacle bore with the inlet port, and a spool is disposed within the check valve receptacle bore for establishing and blocking communication between the pump port and the fluid passage, and is stopped at the blocking position and
- the pressure reduction valve portion is constructed in such a manner that the valve block is formed with first and second ports opening to the pressure reduction valve receptacle bore, and a spool is disposed within the pressure reduction valve receptacle bore to define a first pressure chamber and a second pressure chamber, the first pressure chamber being communicated with a second load pressure detecting port, the second pressure chamber being communicated with a second port, and the spool is biased in one direction by means of a spring to biasing the spool of the check valve portion toward a locking position, the pressure compensation valve is formed with the check valve portion and the pressure reduction valve portion;

a plurality of the valve blocks being connected with establishing communication between respective of the first and second tank ports and the pump ports and the first port, and the pump port and the first port of one of the valve blocks being communicated with the main pump port and the first and second tank port of one of the valve blocks being communicated with the main tank port.

According to th e second aspect of the invention, a direction control valve assembly with a pressure compensation valve comprises:

a valve block being formed with a spool bore, a check valve receptacle bore and a pressure reduction valve receptacle bore;

a direction control valve constructed in such a manner that the valve block being further formed with the inlet port, the first and second load pressure detecting ports, the first and second actuator ports and the first and second tank ports opening to the spool bore, and the main spool is disposed in the spool bore for selectively establishing and blocking communication between the ports;

a check valve portion constructed in such a manner that the valve block is formed with a pump port opening to the check valve receptacle bore and a fluid passage communicating the check valve receptacle bore with the inlet port, and a spool is disposed within the check valve receptacle bore for establishing and blocking communication between the pump port and the fluid passage, and is stopped at the blocking position and a pressure reduction valve portion constructed in such a manner that the valve block is formed with first and second ports opening to the pressure reduction valve receptacle bore, and a spool is disposed within the pressure reduction valve receptacle bore to define a first pressure chamber and a second pressure chamber, the first pressure chamber being communicated with a second load pressure detecting port, the second pressure chamber being communicated with a second port, and the spool is biased in one direction by means of a spring to biasing the spool of the check valve portion toward a locking position, a pressure compensation valve is formed with the check valve portion and the pressure reduction valve portion;

when the main spool is moved from a neutral position in one direction to place at a first pressurized fluid supply position, the input port being communicated with the first actuator port, and the second actuator port being communicated with the tank port, and the main spool is moved from a neutral position in the other direction to place at a second pressurized fluid supply position, the input port establishes communication with a second actuator port, and the first actuator port being communicated with the tank port.

In this case, the main spool is formed with a first smaller diameter section for selectively establishing and blocking communication between the first tank port, the first actuator port and first load pressure detection port;

an intermediate smaller diameter portion and first cut-out for establishing and blocking communication between the second load pressure detection port and the second actuator port, a second smaller diameter portion and a second cut-out for establishing and blocking communication between the second load pressure detection port and the second actuator port, the main spool is formed with a communication groove for selectively establishing communication of the inlet port with one of the first and second load pressure detecting port and the first and second load pressure detecting port are normally communicated with each other.

According to the third aspect of the invention, a pressure compensation type direction control valve assembly comprises:

a valve block being formed with a spool bore, a check valve receptacle bore and a pressure reduction valve receptacle bore;

a direction control valve constructed in such a manner that the valve block being further formed with the inlet port, the first and second load pressure detecting ports which are normally communicated, first and second actuator ports and first and second tank ports opening to the spool bore, and the main spool is disposed in the spool bore for selectively establishing and blocking communication between the ports;

a check valve portion constructed in such a manner that the valve block is formed with a pump port opening to the check valve receptacle bore and a fluid passage communicating the check valve receptacle bore with the inlet port, and a spool is disposed within the check valve receptacle bore for establishing and blocking communication between the pump port and the fluid passage, and is stopped at the blocking position and a pressure reduction valve portion constructed in such a manner that the valve block is formed with first and second ports opening to the pressure reduction valve receptacle bore, and a spool is disposed within the pressure reduction valve receptacle bore to define a first pressure chamber and a second pressure chamber, the first pressure chamber being communicated with a second load pressure detecting port, the second pressure chamber being communicated with a second port, and the spool is biased in one direction by means of a spring to biasing the spool of the check valve portion toward a locking position, a pressure compensation valve is formed with the check valve portion and the pressure reduction valve portion;

the valve block and the main spool being respectively formed with a port and a groove for communicating the second pressure chamber of the pressure reduction valve portion with the tank port when the main spool is moved toward left or right from a neutral position.

In this case, it is desired that a port is formed at an adjacent position to the second tank port in the valve block, the port is communicated with the second pressure chamber through a fluid conduit, the main spool is formed with a first and second grooves for establishing and blocking communication between the port and the second tank port.

According to the fourth aspect of the invention, a pressurized fluid supply system for supplying a discharged pressurized fluid of a hydraulic pump driven by an engine to a plurality of actuators via a pressure compensation valve and a direction switching valve, an unload valve being provided in a discharge line of the hydraulic pump, and the unload valve being biased in unloading direction by the pump discharged pressure and in on-load direction by a load pressure, comprises:

a cylinder operable in response to the load pressure is provided in a revolution speed control portion of the engine so that engine revolution speed is lowered when the load pressure is less than or equal to a set value.

In this case, it is desirable that a control lever of a fuel injection pump of the engine is connected to a lever via a rod, the lever being pivoted in a direction for lowering the engine speed, and a piston rod of the cylinder is connected to the lever, and expansion chamber of the cylinder being communicated with a load pressure detecting line.

According to the fifth aspect of the invention, a pressurized fluid supply system comprises:

a pressure compensation valve provided at an inlet side of each actuator, being formed with a check valve portion for opening and closing between a pump discharge line and an inlet port of a direction control valve and a pressure reduction valve portion for lowering pressure of the pump discharge pressure;

the check valve portion being constructed to move in opening direction by an inlet pressure and to move in closing direction by an outlet pressure;

the pressure reduction valve portion being contacted to the check valve portion by means of a spring, depressed in a direction to establish communication between inlet side and outlet side and to move away from the check valve by a pressure in one of pressure chambers, and pressed in a direction to block communication between the inlet side and the outlet side and to close the check valve by the pressure in another pressure chamber, the one of pressure chamber being supplied a load pressure of an own actuator and another pressure chambers being communicated to the outlet side, the discharge line of the hydraulic pump being connected to the inlet side of the check valve and outlet side of the hydraulic pump and another hydraulic pressure source being connected to the inlet side of the pressure reduction valve portion via a high pressure preferential valve.

According to the sixth aspect of the invention, a pressure compensation valve comprises:

a check valve portion including a valve for establishing and blocking communication between an inlet port and an outlet port provided in a valve body;

a pressure reduction valve portion including a spool provided in the valve body for establishing communication between a second port and a third port with the pressure of a first pressure chamber communicated with a first port and blocking communication between the second port and the third port by the pressure in a second pressure chamber communicated with the third port;

the spool being biased in a direction for blocking communication between the second port and the third port by means of a spring to contact with a push rod extending into the first pressure chamber to connect the outlet port to the inlet side of a direction switching valve, and a load pressure detecting line connected to the outlet side of the direction switching valve being connected to the first port.

According to the seventh aspect of the invention, a pressure compensation valve comprises:

a check valve portion including a valve for establishing and blocking communication between an inlet port and an outlet port provided in a valve body;

a pressure reduction valve portion including a spool provided in the valve body for establishing communication between a second port and a third port with the pressure of a first pressure chamber communicated with a first port and blocking communication between the second port and the third port by the pressure in a second pressure chamber communicated with the third port;

the spool being biased in the direction for blocking communication between the second port and the third port to contact with the valve by means of a spring, and the diameter of the valve being smaller than the diameter of the spool.

According to the eighth aspect of the invention, a pressure compensation valve comprises:

a check valve portion including a valve for establishing and blocking communication between an inlet port and an outlet port provided in a valve body;

a pressure reduction valve portion including a spool provided in the valve body for establishing communication between a second port and a third port with the pressure of a first pressure chamber communicated with a first port and blocking communication between the second port and the third port by the pressure in a second pressure chamber communicated with the third port, and the spool being biased in the direction for blocking communication between the second port and the third port to contact with the value by means of a spring;

a third pressure chamber for pushing the spool in a direction for establishing communication between the second port and the third port, and a switching valve for communicating the third pressure chamber with the first port and the third port.

In this case, it is desired that the switching valve is switched at a first position for communicating the first port to the third pressure chamber and a second position for communicating the third port to the third pressure chamber.

BRIEF DESCRIPTION OF THE DRAWING

The present invention will be understood more fully from the detailed description given herebelow and from the accompanying drawings of the preferred embodiment of the present invention, which, however, should not be taken to be limitative to the invention, but are for explanation and understanding only.

In the drawings.

BEST MODE FOR IMPLEMENTING THE INVENTION

The preferred embodiments of the present invention will be discussed hereinafter with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the present invention.

Figure 3:
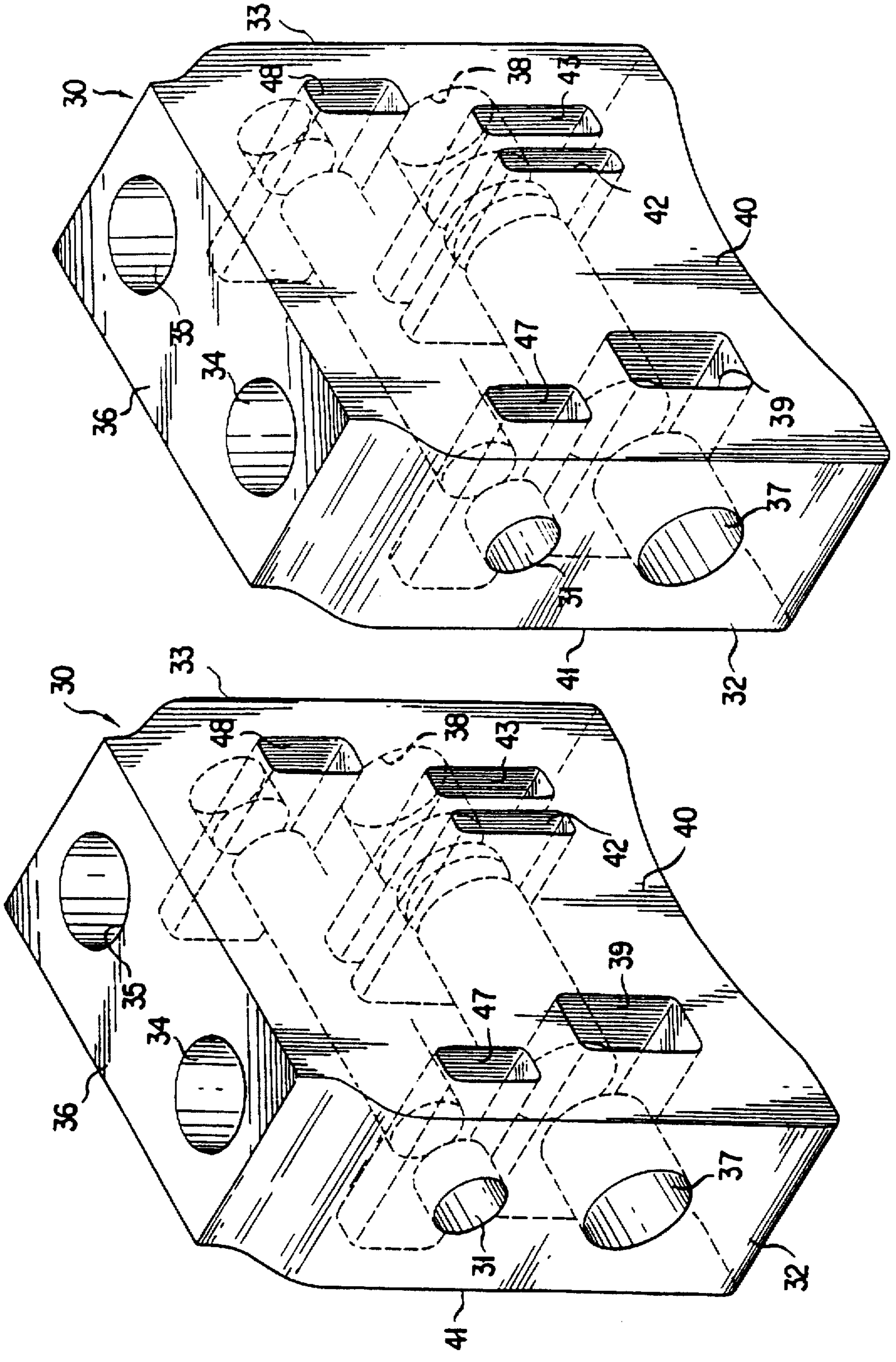
FIG. 3 is a perspective view of a valve block in the preferred embodiment of the present invention.

As shown in FIG. 3, a valve block 30 of the present embodiment is generally of a quadrangular parallelpiped configuration. At the position in the vicinity of the upper portion of the valve block 30, a spool bore 31 is formed with openings at both of the left and right side surfaces 32 and 33. First and second actuator ports 34 and 35 opening to the spool bore 31 are formed to open in the upper surface 36. At the positions in the vicinity of the lower portion of the valve block 30, a check valve bore 37 opening to the left side surface 32 and a pressure reduction valve bore 38 opening to the right side surface 33 are formed in coaxial fashion. A pump port 39 opening to the check valve bore 37 is formed with the ends opening to front and rear surfaces 40 and 41. First and second ports 42 and 43 opening to the pressure reduction valve bore 28 are formed with ends opening to the front and rear surfaces 40 and 41. When a plurality of valve blocks 30 are coupled with mating the front and rear surfaces, respective pump ports 39 and first and second ports 42 and 43 are communicated with each other.

Figure 4:
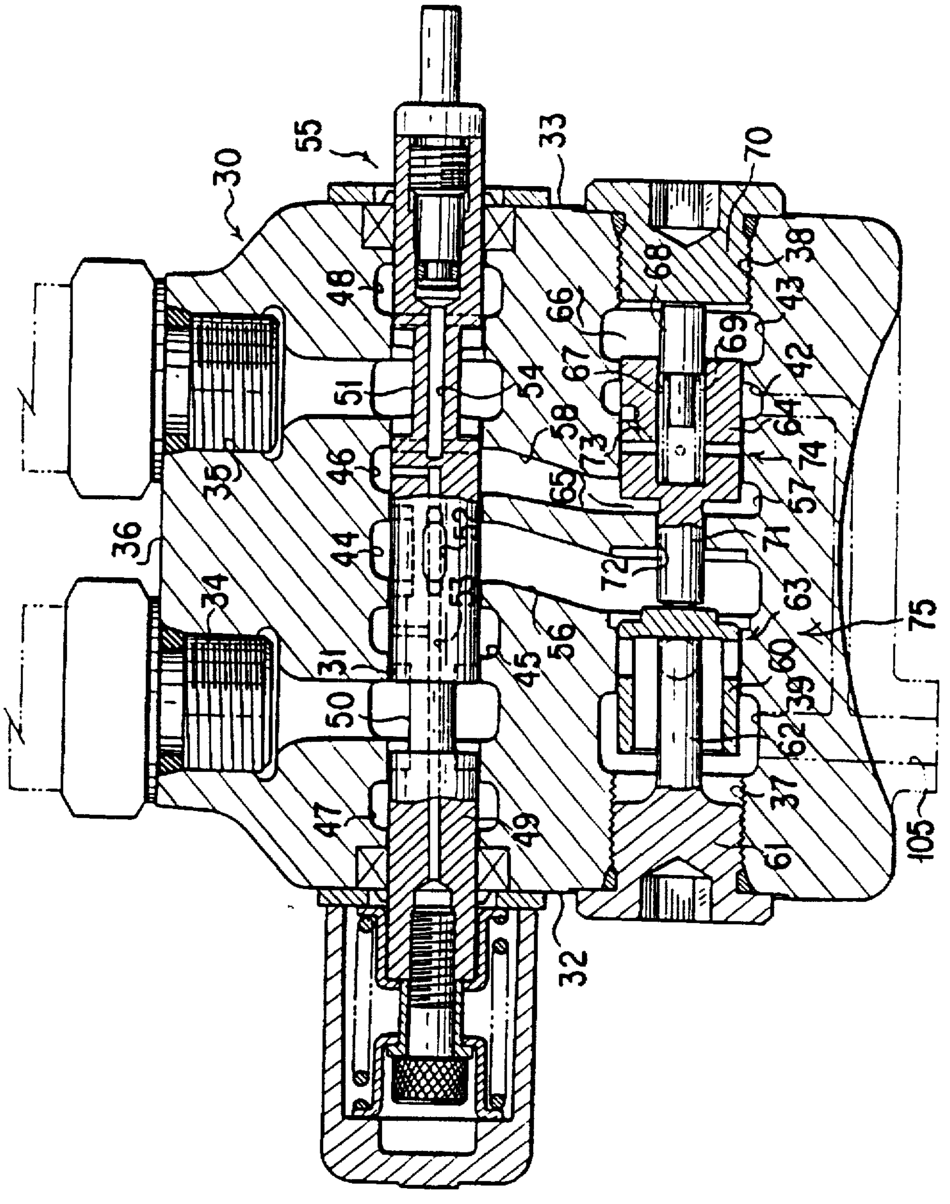
FIG. 4 is a section in a condition where a main spool and spool bore are assembled to the valve block.

As shown in FIG. 4, the valve block 30 is formed with inlet ports 44, first and second load pressure detection ports 45, 46, the first and second actuator ports 34, 35 and first and second tank ports 47, 48 opening to the spool bore 31. A main spool 49 disposed within the spool bore 31 is formed with first and second smaller diameter portions 50, 51 and a communication groove 52. Furthermore, the main spool 49 is formed with a first fluid passage 53 constantly communicating the first and second load pressure detection ports 45 and 46 and a second fluid passage 54 selectively communicating and blocking between the second load pressure detection portion 46 and the second tank port 48. The main spool 49 is biased toward a neutral position A by means of a spring. At the neutral position A, the main spool 49 blocks respective ports, and communicates the second load pressure detection port 46 and the second tank port 48 via the second fluid passage 54. The main spool 49 slides laterally. At a first pressurized fluid supply position B where the main spool 49 is shifted toward the right, the second actuator portion 35 is communicated with the second tank port 48 via the second small diameter portion 51, the inlet port 44 is communicated with the second load pressure detection port 46 via the communication groove 52, and the first actuator port 34 is communicated with the first load pressure detection port 45 via the first small diameter portion 50. Also, the communication between the first load detection port 46 and the second tank port 48 is blocked. On the other hand, at the second pressurized fluid supply position C where the main spool 49 is shifted toward the left, the first actuator port 34 and the first tank port 47 are communicated via the first small diameter portion 50, the inlet port 44 is communicated with the first load pressure detection port 45 via the communication groove 52, the second actuator port 35 is communicated with the second load pressure detection port 46 via the second small diameter portion 51, and communication between the first load pressure detection port 46 and the second tank port 48 is blocked. The spool bore 31 and the main spool 49 form the direction control valve 55 with the construction set forth above.

On the other hand, the check valve receptacle bore 37 is communicated with the inlet port 44 via a fluid passage 56. For the check valve receptacle bore 37, a check valve 60 is engaged for selectively communicating and blocking between the first pump port 39 and the inlet port 44. The check valve 60 is restricted in sliding movement toward the left beyond the shown position by means of a stopper rod provided on a plug 61, and is normally placed at a blocking position. With this check valve receptacle bore 37 and the check valve 60, the check valve portion 63 is formed.

The pressure reduction valve receptacle bore 38 is communicated with the second load pressure detecting port via a third port 57 and a fluid passage 58. In the pressure reduction valve receptacle bore 38, a spool 64 is slidably inserted to form a first pressure chamber 65 and a second pressure chamber 66. The first pressure chamber 65 is communicated with the third port 57, and the second pressure chamber 66 communicates with a second port 43. The spool 64 is formed with a blind bore 67. In the blind bore 67, a free piston 68 is inserted. Between the free piston 68 disposed in the blind bore 67 of the spool 64 and the bottom of the blind bore 67, a spring 69 is provided for biasing the free piston 68 toward a plug 70 for contacting. Furthermore, the spool 64 is formed integrally with a push rod 71. The push rod 71 is extended through a through opening 72 to contact the check valve 60 to a stopper rod 62. The spool 64 is further formed with an orifice 73 for communicating the first port 42 and the blind bore 67. With the construction set forth above, the pressure reduction valve portion 74 is formed. Furthermore, with this pressure reduction valve portion 74 and the check valve portion 63, the pressure compensation valve 75 is formed.

Figure 5:
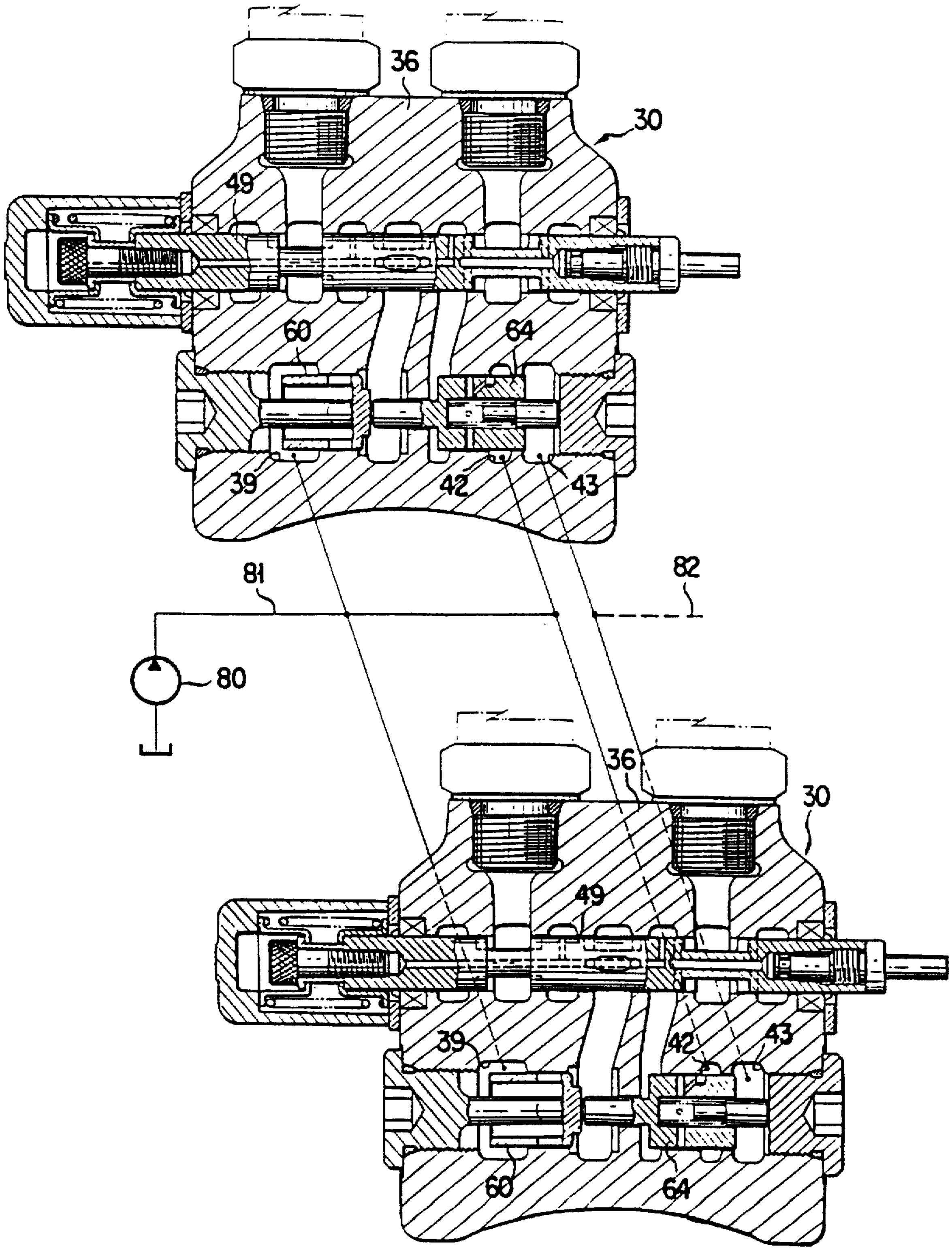
FIG. 5 is a perspective view showing a connecting condition of a plurality of valve blocks.
Figure 6:
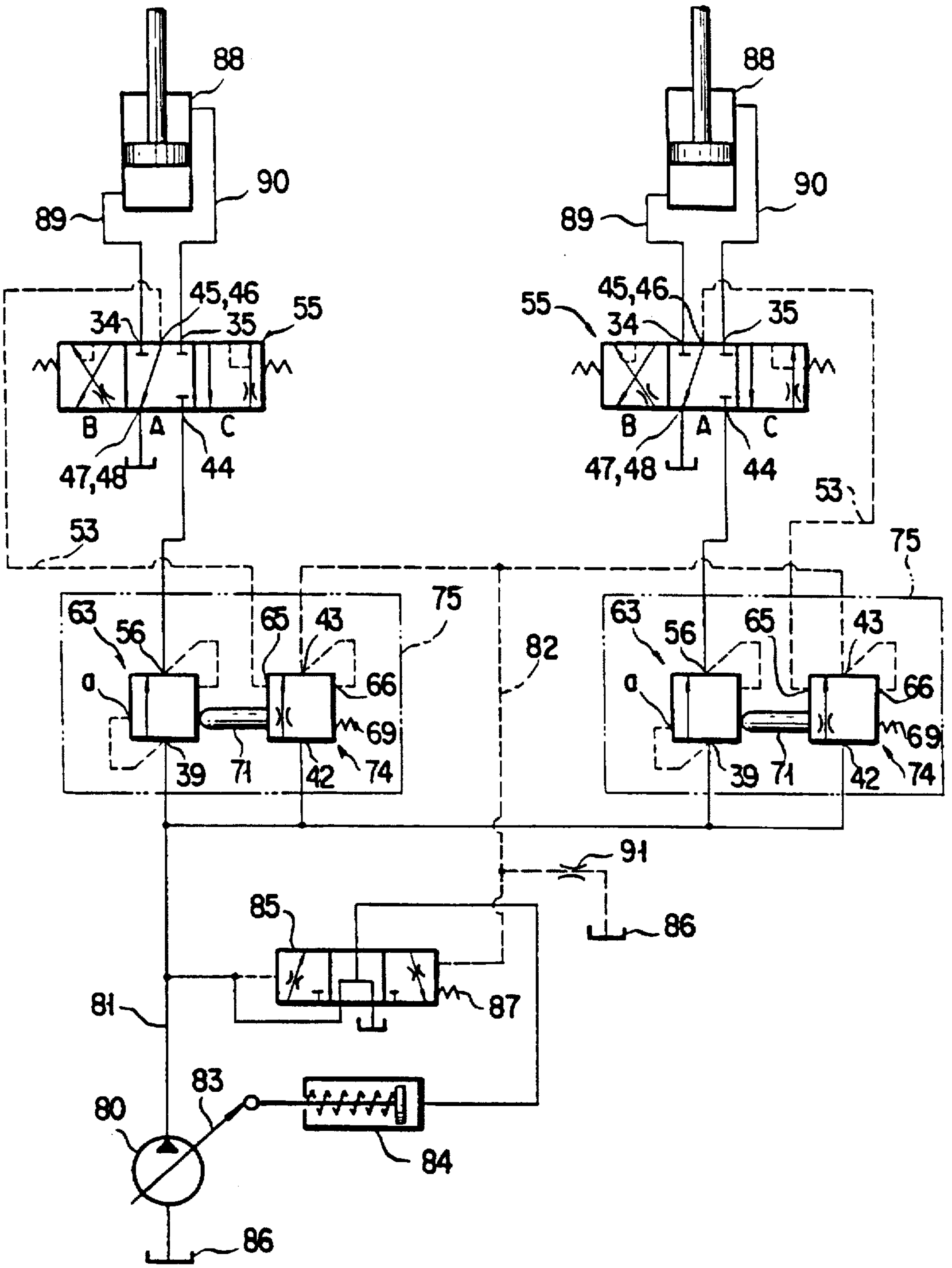
FIG. 6 is a circuit diagram of the hydraulic circuit of FIG. 5.

As set forth above, when a plurality of the valve blocks 30 are connected with mating the front and rear surfaces 40 and 41, the pump ports 39 and the first and second ports 42 and 43 of respective valve blocks 30 are communicated. Therefore, by connecting a discharge passage 81 of the hydraulic pump 80 to the pump port 39 and the first port 42 as shown in FIG. 5, and by connecting a load pressure detection passage 82 to the second port 43, a hydraulic circuit for distributing a flow rate of a discharged pressurized fluid of a single hydraulic pump to a plurality of actuators can be constructed, as shown in FIG. 6. In FIG. 6, 83 denotes a swash plate for controlling discharge flow rate of the hydraulic pump 80, 84 denotes a servo cylinder and, 85 denotes a direction control valve for adjustment of the pump.

Figure 7:
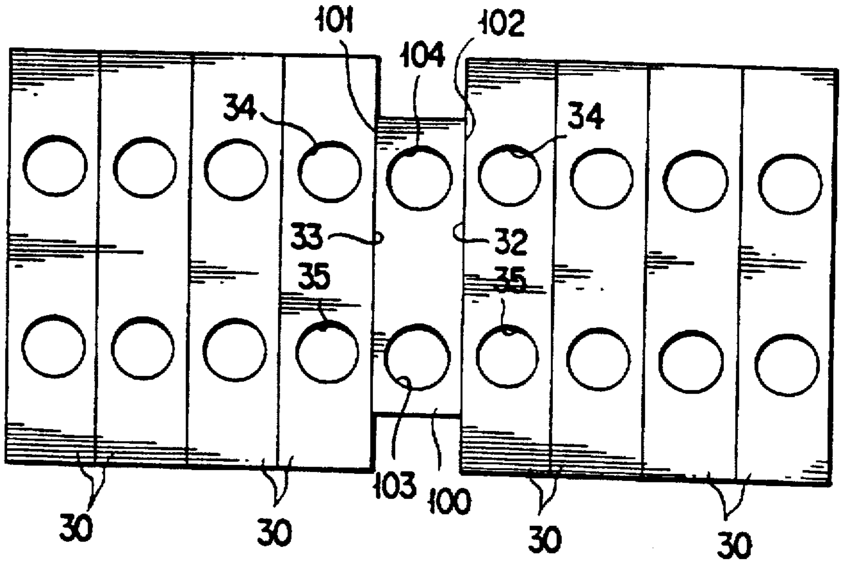
FIG. 7 is a plan view showing one example of a combination of a plurality of valve blocks.

FIG. 7 shows a plan view showing a connecting condition of the valve blocks 30. On both side surfaces 101, 102 of an intermediate block 100, left and right side surfaces 32, 33 of the valve block 30 are connected. A main inlet port 103 and a main tank port 104 are formed in the intermediate block 100. The main inlet port 103 is opened at both side surfaces 101 and 102 to communicate with the pump port 39 and the first port 42 of the left and right valve blocks 30. The main tank port 104 is also opened to the both side surfaces 101, 102 to communicate with the first and second tank ports 47, 48 of the left and right valve blocks 30.

Figure 8:
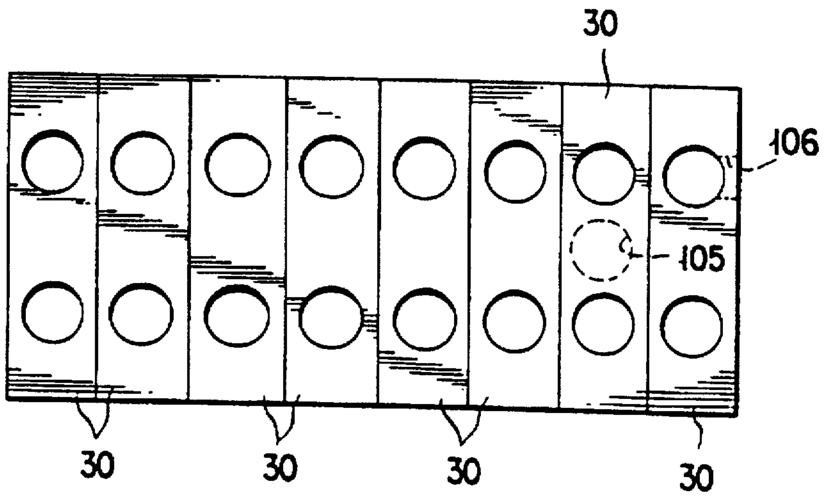
FIG. 8 is a plan view showing another example of a combination of a plurality of valve blocks.

On the other hand, as shown in FIG. 8, at the lower surface of one of the arbitrarily selected valve blocks 30, a main inlet port 105 is formed. Also, in the outermost valve blocks 30, a main tank port 106 may be formed for direct connection of a plurality of valve blocks 30. It should be appreciated that the main port 105 formed at the lower surface of the valve block 30 may be formed as shown by phantom line in FIG. 4, for example.

Next, operation will be discussed with reference to FIG. 6. When Direction Control Valve 55 is in Neutral Position A, a working fluid sucked from a tank 86 by the hydraulic pump 80 is introduced into the opening side pressure chamber a of the check valve 63 via the discharge line 81. At this time, the pressure chambers 65 and 66 of the pressure reduction valve 74 are open to the tank 86. Accordingly, the pressures in the pressure chambers 65 and 66 are held zero. At this condition, the push rod 71 of the pressure reduction valve 74 is biased toward the check valve portion 63 by a relatively small spring force of a spring 69. Then, the push rod 71 is simply contacted to the check valve 60. On the other hand, the discharge pressure of the hydraulic pump 80 is maintained at a pressure having a constant pressure difference relative to the pressure in the load pressure detection passage 82 by a spring 87 of the direction control valve 85 for adjusting the pump. Here, assuming that the pressure difference is 20 $kg/cm^2$, since the pressure in the load pressure detecting passage 82 is held zero, the pump discharge pressure risen up to 20 $kg/cm^2$. In conjunction therewith, the pump discharge pressure is introduced into the pressure chamber a of the check valve portion 63 to shift the check valve 60 until the inlet pressure (outlet pressure of the check valve portion 63) of the direction control valve 55 becomes equal to the pump discharge pressure. When the pump discharge pressure and the inlet pressure of the direction control valve 55 become equal to each other, the check valve 60 is reseated by the spring 69. The pressure reduction valve portion 74 establishes a fluid communication between the discharge line 55 of the hydraulic pump 80 with the pressure chamber 66 only at the stroke end. On the other hand, the check valve 63 communicates the pump discharge line 81 to the outlet side before the stroke end. Accordingly, while the direction control valve 55 is in the neutral position A, a communication of the pump discharge line 81 and the pressure chamber 66 will never been established, and the pressure in the pressure chamber 65 is maintained at zero.

When Only One Direction Control valve is in First Pressurized Fluid Supply Position B Here, it is assumed that the left side direction control valve 55 is shifted to the first pressurized fluid supply position B, and the right side direction control valve 55 is maintained at the neutral position A. By the shift of the direction control valve 55, the inlet port 44 and the first actuator port 34 are connected. At the same time, the second actuator port 35 and the second tank port 48 are connected. At this time, the second actuator 35 and the second tank port 48 are connected. At this time, if the pressure (load pressure) in a conduit 89 connecting the first actuator port 34 and the actuator 88 is greater than the pump discharge pressure (20 $kg/cm^2$), the check valve 60 of the check valve portion 63 is reseated by the pressure of the pressure chamber b. Therefore, natural drop of the actuator 88 can be prevented. The pressure of the conduit 89 of the actuator 88, namely, the load pressure is introduced into one pressure chamber 65 of the pressure reduction valve portion 74 via the first fluid passage 53 and the path 58. At this time, since the pressure of the other pressure chamber 66 becomes zero, the spool 64 of the pressure reduction valve portion 74 shifts to the stroke end in the side remote from the check valve portion 63. By this, the pump discharge passage 81 and the load pressure detecting path 82 are communicated with each other via the throttle of the pressure reduction valve 74. When the pressure in the conduit 89 is higher than the pump discharge pressure (20 $kg/cm^2$), the check valve 60 of the check valve portion 63 is blocked by the pressure in the pressure chamber b, and this pressure is introduced into one pressure chamber 65 of the pressure reduction valve portion 74. Accordingly, even when the other pressure chamber 66 is communicated with the pump discharge line 55, the spool of the pressure reducing valve 74 is maintained in the shifted position. On the other hand, when the pressure (load pressure) in the passage 41 is lower than the pump discharge pressure (20 $kg/cm^2$), the load pressure is introduced into one pressure chamber 65 of the pressure reduction valve portion 74. By this, the spool 64 of the pressure reduction valve portion 74 shifts in response to the pressure of the pressure chamber 65. On the other hand, when the pressure in the other pressure chamber 66 rises to the pressure (namely, load pressure) of one pressure chamber 65, the pressure reduction valve portion 74 moves to a blocked position by the small spring force of the spring 69 to contact the push rod 71 to the check valve 60 of the check valve portion 63. In either case, the pressure reduction valve portion 74 maintains communication between the pump discharge line 81 and the pressure chamber 66 until the pressure of one pressure chamber 65 becomes equal to the pressure of the other pressure chamber 66. When the pressures in both pressure chambers 65 and 66 are equal to each other, the pressure reduction valve portion 74 moves to the blocked position by the small spring force of the spring 69 to contact the push rod 71 provided on the spool 64 to the check valve 60. As a result, the pressure of the load pressure detecting passage 82 becomes equal to the load pressure, and the pump discharge pressure is controlled at a pressure higher than the pressure of the load pressure detecting passage 82 to the extent of a certain pressure difference (e.g. 20 $kg/cm^2$) by the direction control valve 85 for adjustment of the pump. Since the pump discharge pressure is introduced into the inlet port 44 via the check valve portion 63, the pressure difference (20 $kg/cm^2$) between the inlet pressure and the outlet pressure (load pressure) of the direction control valve 55 can be maintained. Accordingly, only by variation of the opening area of a throttle between the inlet side and the outlet side associated with shift of the direction control valve 55, the flow rate of the pressurized fluid to be distributed to the actuators 88 is controlled. When the direction control valve 55 is shifted, the conduit 89 or 90 of the actuator 88 is connected to the second fluid passage 53 for introducing the load pressure. On the other hand, the second fluid passage 53 is connected to one pressure chamber 65 of the pressure reduction valve 74. However, since the load pressure is used only as a pilot pressure (set pressure of the pressure reduction valve) in the pressure reduction valve 74, the draining of the pressure will never been caused. Accordingly, upon shifting the direction control valve 55, the natural drop of the actuator 88 due to drop of the load pressure will never be caused.

The load pressure detecting passage 82 is also connected to the other pressure chamber 66 of the pressure reduction valve portion 74 of the pressure compensation valve 75 arranged in the other direction control valve 55. However, since one pressure chamber 65 of the pressure reduction valve portion 74 is communicated with the tank 86 by the direction control valve 55 in the neutral position A, the pressure in the first fluid passage 53 for introducing the load pressure is held zero, and thus the pressure reduction valve portion 74 biases the check valve portion 63 to the valve closing direction by the pressure of the pressure chamber 66. On the other hand, in the pressure chamber a generating the pressure in the valve opening direction of the check valve portion 74, the discharge pressure of the pump is introduced from the pump discharge line 81. Therefore, as a whole, with the pressure difference (20 kg/cm$^2$) between the pump discharge pressure and the pressure of the load pressure detecting passage 82, the check valve portion 63 and the pressure reducing valve portion 74 are shifted in the valve opening direction of the check valve portion 63. However, the shift is quite small so that the check valve is reseated with the small spring force of the spring 69 when the pressure of the pump port 44 reaches the predetermined pressure difference (20 kg/cm$^2$). Accordingly, the pressure reduction valve portion 74 will never be shifted to the stroke end. Therefore, it will never influence for the hydraulic pressure control by the direction control valve 55.

When Both Direction Control Valves 55 are in the First Pressurized Fluid Supply Positions B and When Total of Necessary Flow Rate of Respective Actuators 88 is Less Than or Equal to the Maximum Discharge Flow Rate of Hydraulic Pump 20

Here, it is assumed that both of the direction control valves 55 are shifted to the first pressurized fluid supply positions B, and respective pump ports 44, the conduits 89, and the first fluid passages 53 for introduction of the load pressure are connected. The pressure reduction valve portion 74 of the pressure compensation valve 75 of one of the direction control valves 55 is maintained at the stroke end until the pressure in the pressure chamber 66 becomes equal to the pressure of one the of pressure chambers 65 of both pressure compensation valves, and the pressure reduction valve portion 74 of the pressure compensation valve 75 of the other direction control valve 55 is similarly to the former until the pressure chamber 66 becomes equal to the pressure of one of the pressure chambers 65. Here, it is assumed that among the shown two actuators 88, the load pressure of the left side actuator is greater than the load pressure of the right side actuator. In order to facilitate the following discussion, it is further assumed that the load pressure of the left side actuator 88 is 100 kg/cm$^2$ and the load pressure of the right side actuator is 10 kg/cm$^2$. Since the load pressure detecting passage 82 is connected to the tank 86 via an orifice 91, the pressure of the load pressure detecting passage 82 is held zero before the direction control valves 55 are shifted. Accordingly, respective pressure reduction valve portions 74 are shifted by the pressure in the first fluid passages 53 for introduction of the load pressure so as to introduce the pump discharge pressure into the pressure detecting passage 82. When the pressure of the load pressure detecting passage 82 rises to the pressure (10 kg/cm$^2$) of the conduit 89 of the right side actuator 88, the pressure reduction valve portion 74 of the right side pressure compensation valve 75 is closed, at first. At this time, the pressure reduction valve portion 74 of the left side pressure compensation valve 75 is held at a shifted condition. Therefore, the pressure of the load pressure detecting passage 82 rises until it becomes equal to the discharge pressure (20 kg/cm$^2$) of the hydraulic pump 80. At this time, the pressure of the pump port 44 of the direction control valve 55 for the left side actuator 88 in higher pressure side is 100 kg/cm$^2$, and the check valve portion 63 of the pressure compensation valve 75 is in the closed condition to be separated from the pressure reduction valve 74. The pressure reduction valve portion 74 of the another pressure compensation valve 75 biases the check valve portion 63 in the valve closure direction with the pressure difference (20–10=10 kg/cm$^2$) of two pressure chambers 65 and 66. At this time, the pressure of the pressure chamber a acting in the valve opening direction for the check valve 60 of the check valve portion 63, is 20 kg/cm$^2$ which is equal to the pump discharge pressure. Therefore, the check valve portion 63 is maintained in open position until the pressure at the pump port 44 of the direction control valve 55 becomes 10 kg/cm$^2$. Subsequently, the check valve portion 63 is closed by the spring 69. By the direction control valve 85 for adjusting the pump, the pump discharge pressure is controlled at a pressure (40 kg/cm$^2$) higher than the pressure (20 kg/cm$^2$) of the load pressure detecting passage 82 in the extent of the predetermined pressure difference (20 kg/cm$^2$). Even at this time, the check valve portion 63 of the higher pressure side pressure compensation valve 75 is maintained in closed position, and the pressure reduction valve 74 is held in the shifted position. Therefore, the pressure in the load pressure detecting passage 82 rises to 40 kg/cm$^2$. On the other hand, the pressure reduction valve 74 in the lower pressure side pressure compensation valve 75 biases the check valve portion 63 in the valve closure direction with the pressure difference (30 kg/cm$^2$) between the load pressure detecting passage 82 and the first passage 53 for introducing the load pressure. As a result, the pressure at the pump port 44 of the lower pressure side direction control valve 55 is maintained at 10 kg/cm$^2$. As set forth above, the pressures in the load pressure detecting passage 82 and the pump discharge pressure are continuously rising. When the pump discharge pressure reaches the load pressure (100 kg/cm$^2$) of the higher pressure side actuator 88, the pressures in the two pressure chambers 65 and 66 of the pressure reduction valve portion 74 of the higher pressure side pressure compensation valve 75 become 100 kg/cm$^2$. Then, the pressure reduction valve portion 74 is closed with the small spring force of the spring 69. Then, the push rod 71 contacts with the check valve 61 of the check valve portion 63. At this time, the pressure reduction valve portion 74 of the lower pressure side pressure compensation valve 75 biases the check valve in the valve closure direction with the pressure difference (100–10=90 kg/cm$^2$) between the load pressure detecting passage 82 and the first fluid passage 53 for introduction of the load pressure to maintain the pressure at the inlet port 44 of the lower pressure side direction control valve at 10 kg/cm$^2$. Again, the pump discharge pressure is controlled at 120 kg/cm$^2$ by the pump adjusting direction control valve 85. At this time, the pressure reduction valve portion 74 of the higher pressure side pressure compensation valve 75 contacts the push rod 71 thereof to the check valve 61 of the check valve portion 63 with only small spring force of the spring 69. The check valve portion 63 is opened by the pressure difference between the two pressure chambers a and b to introduce the 120 kg/cm$^2$ of the pump discharge pressure to the inlet port 44 of the direction control valve 55. On the other hand, the pressure reduction valve portion 74 of the lower pressure side pressure compensation valve 75 maintains the check valve portion 63 in the closed position with the pressure difference (90 kg/cm$^2$) between the load pressure detecting passage 82 and the first fluid passage 53 for introducing the load pressure. However, at a condition where the pressure of the pressure chamber a for opening the check valve portion 63 becomes 120 kg/cm$^2$ so that the pressure of inlet port 44 of the direction control valve 55 becomes 30 kg/cm$^2$ (120–90), balance is established in the check valve portion 63 and the pressure reduction valve portion 74. Accordingly, the check valve portion 63 and the pressure reduction portion 74 slightly shifts so that the check valve portion 63 lowers the 120 kg/cm$^2$ of the pump discharge pressure to 30 kg/cm$^2$. At this condition, the hydraulic control system balances. Then, the pressure at the inlet port 44 at the higher pressure side direction control valve 55 becomes 120 kg/cm$^2$ and the pressure at the inlet port 44 at the lower pressure side direction control valve 55 becomes 30 kg/cm$^2$. By this, both of the pressure differences of the inlet pressures and the outlet pressures in the two direction control valves 55, 55 become 20 kg/cm$^2$. Accordingly, the two direction control valves can control the flow rate of the pressurized fluid to be supplied to the actuators 88, 88 only by the shifting magnitude.

When Total Necessary Flow Rate of Respective Actuators 88, 88 is Greater Than or Equal to Maximum Discharge Amount of Hydraulic Pump 80

Here, the load pressures and the necessary flow rates of the actuators 88, 88 are assumed at 100 kg/cm$^2$ and 501 cm$^3$/min in the left side actuator 88 and 10 kg/cm$^2$ and 501 cm$^3$/min in the right side actuator 88. When the maximum discharge amount of the hydraulic pump 80 is greater than or equal to 1001 cm$^3$/min, since the difference of the inlet pressure and the outlet pressure of the direction control valve 55 can be maintained constant as set forth above, flow rate can be controlled by the shifting magnitude to distribute the flow rate for respectively 501 cm$^3$/min. Next, it is assumed that the maximum discharge amount of the hydraulic pump 80 is 701 cm$^3$/min. Since the inlet pressures of two direction control valves 55, 55 are respectively 120 kg/cm$^2$ and 30 kg/cm$^2$, the flow rate of the higher pressure side direction control valve 55 is decreased from 501 cm$^3$/min to 201 cm$^3$/min. On the other hand, the flow rate of the lower pressure side direction control valve 55 is maintained at 501 cm$^3$/min. Assuming that the shifting magnitude (opening area) of the two direction control valves 55, 55 are not varied, the pressure difference becomes smaller than the predetermined pressure difference (20 kg/cm$^2$) corresponding to lowering of the pressure difference between the inlet pressure and the outlet pressure in the higher pressure side direction control valve 55. Here, assuming that the pressure difference is decreased to 14 kg/cm$^2$, namely lowered from 120 kg/cm$^2$ to 114 (100+14) kg/cm$^2$. Since the pressures of two pressure chambers 65 and 66 are maintained at 100 kg/cm$^2$, the reduction valve portion 74 is only contacted to the check valve portion by the weak spring 69, lowering of the pressure of the pressure chamber b of the valve closure direction for the check valve portion 63 from 120 kg/cm$^2$ to 114 kg/cm$^2$ should cause reduction of the pressure in the pressure chamber a of the valve open direction for the check valve portion 63 in opening of the check valve portion 63 (at stroke end). Namely, the pump discharge pressure is lowered from 120 kg/cm$^2$ to 114 kg/cm$^2$. At this time (when lack of the pump discharge amount), the pump discharge amount cannot depend on the control of the pump adjusting direction control valve 85. On the other hand, the pressures of the pressure chambers 65 and 66 of the pressure reduction valve portion 74 of the lower pressure side pressure compensation valve 75 are respectively maintained at 100 kg/cm$^2$ and 10 kg/cm$^2$ to bias the check valve portion 63 toward the valve closure direction with the pressure difference (90 kg/cm$^2$). The pressure of the pressure chamber a generating the force in the valve open direction for the check valve portion 63, namely the discharge pressure of the pump is lowered to 114 kg/cm$^2$. Therefore, the balance in the check valve portion 63 and the pressure reduction valve portion 74 is established at the reduced pressure from 30 kg/cm$^2$ to 24 kg/cm$^2$ in the pressure chamber b generating the force in the valve closure direction. Accordingly, the pressure difference between the inlet pressure and the outlet pressure of the lower pressure side direction control valve 55 is reduced from 20 kg/cm$^2$ to 14 (24–10) kg/cm$^2$. The direction control valve 55 reduces the supply flow rate for the lower pressure side actuator 88 from 501 cm$^3$/min corresponding to reduction of the pressure difference. Corresponding to this, the supply flow rate for the higher pressure side actuator 88 is increased from 201 cm$^3$/min. Namely, balance of the hydraulic system is established at the condition where the pressure differences between the inlet pressure and the outlet pressure of the direction control valves 55, 55 are equal to each other, and the supply flow rates for both actuators 88, 88 are 351 cm$^3$/min.

When Three or More Actuators 88 are loaded for one Hydraulic Pump

When the number of actuators 88 to be driven hydraulically is more than or equal to three, the foregoing principle of operation can be achieved by arranging another pressure compensation valve 75 including the check valve portion 63 and the pressure reduction valve portion 74 between the hydraulic pump and the direction control valve, and introducing the pressure differences in the valve closure direction of respective pressure reduction valve portions to the load pressure detecting passage 82. While the hydraulic pump has been discussed as the variable displacement type in the foregoing embodiment, the hydraulic pump 80 may be a fixed displacement type. In such case, an unload valve may be disposed in the pump discharge line 81 of the hydraulic pump 80.

Since the main spool 49 of the direction control valve 55 and the check valve portion 63 and the pressure reduction valve portion 74 of the pressure compensation valve 75 are assembled in one valve block 30, and the direction control valve assembly is formed by coupling a plurality of valve blocks 30, the overall size becomes compact to require smaller installation space to permit installation for smaller construction machines.

Figure 9:
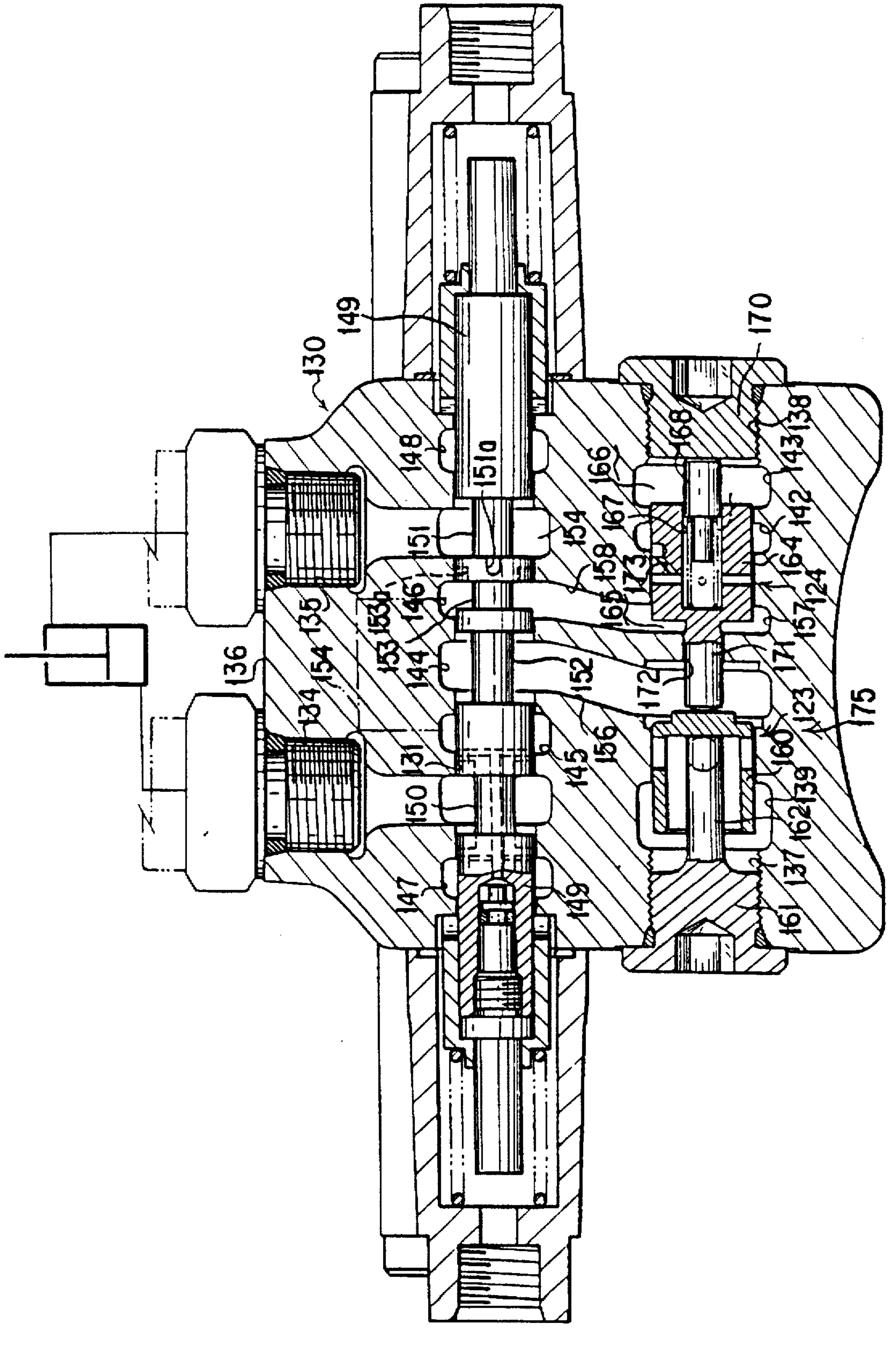
FIG. 9 is a section of a direction control valve assembly to be employed in the preferred embodiment of a pressurized fluid supply system according to the present invention.

FIG. 9 shows another embodiment of the direction control valve to be employed in the pressurized fluid supply system according to the present invention.

As shown in FIG. 9, the valve block 130 is formed with an inlet port 144 and first and second load pressure detection ports 145, 146, first and second actuator ports 134, 135 and a first tank port 147 respectively opening to a spool bore 131. A main spool 149 disposed in the spool bore 131 is formed with first and second smaller diameter portions 150, 151, a communication groove 152 and an intermediate smaller diameter portion 153. The first and second load pressure detection ports 145, 146 are communicated through a port 154. The spool 149 is maintained at the neutral position A in which communications between ports are blocked, by spring. When the spool 149 is slidingly shifted toward right, a first pressure supply position B, in which the second load pressure detection port 146 and the second actuator port 135 are communicated through the intermediate smaller diameter portion 153 and a first cut-out 153*a*, the inlet port 144 is communicated with the second load pressure detection port 146 via the communication groove 152, the first actuator port 134 is communicated with the first load pressure detection port 145 via the first smaller diameter portion 150, and communication between the first actuator port 134 and the first tank port is blocked, is established. When the spool 149 is slidingly shifted toward left, a second pressure supply position C, in which the first actuator port 134 is communicated with the first tank port 147 via the first smaller diameter portion 150, the inlet port 144 is communicated with the first load pressure detection ports 145 via the communication groove 152, the second actuator port 135 is communicated with the second load pressure detection port 146 via the second smaller diameter portion 151 and the second cut-out 151*a*. Thus, the direction control valve is constructed.

The check valve receptacle bore 137 opens to the inlet port 144 via a passage 156. To the check valve receptacle bore 137, a valve 160 which established and blocks communication between the pump port 139 and the input port 144 is disposed. The valve 160 is restricted in sliding motion toward the left beyond the shown position by a stopper rod 162 provided on a plug 161 to be maintained at the communication blocking position. Thus, a check valve portion 163 is constructed.

The pressure reduction valve receptacle bore 138 is communicated with the second load pressure detecting port 146 via a third port 157 and a fluid passage 158. In the pressure reduction valve receptacle bore 138, a spool 164 is slidably inserted to form a first pressure chamber 165 and a second pressure chamber 166. The first pressure chamber 165 is communicated with the third port 157, and the second pressure chamber 166 communicates with a second port 143. The spool 164 is formed with a blind bore 167. In the blind bore 167, a free piston 168 is inserted. The free piston 168 is biased toward a plug 170 by means of a spring 169 inserted between the free position 168 and the bottom portion of the blind bore 167. Furthermore, the spool 64 is formed integrally with a push rod 171. The push rod 171 is inserted through a through opening 172 formed in a partitioning wall of the valve block 130 and contacts the check valve 160 to the stopper rod 162. The spool 164 is further formed with an orifice 173 for communicating the first port 142 and the blind bore 167. With the construction set forth above, the pressure reduction valve portion 174 is formed. Furthermore, with this pressure reduction valve portion 24 and the check valve portion 163, the pressure compensation valve 175 is formed.

Therefore, by providing the main spool 149 to be the direction control valve, the valve 160 to form the check valve portion 163 and the spool 164 to form the pressure reduction valve portion 174 in one valve block 130, the direction switching valve assembly with the pressure compensation valve can be constructed.

When the spool 149 is shifted toward the right to be placed at the first pressurized fluid supply position B, the pressurized fluid introduced into the second actuator port 135 from the actuator flows into the second load pressure detection port 146 through the cut-out 153*a* and the intermediate smaller diameter portion 153 to confluence with the pressurized fluid introduced into the inlet port 144 to be supplied to the first actuator port 134. Therefore, regenerating function can be achieved.

Figure 10:
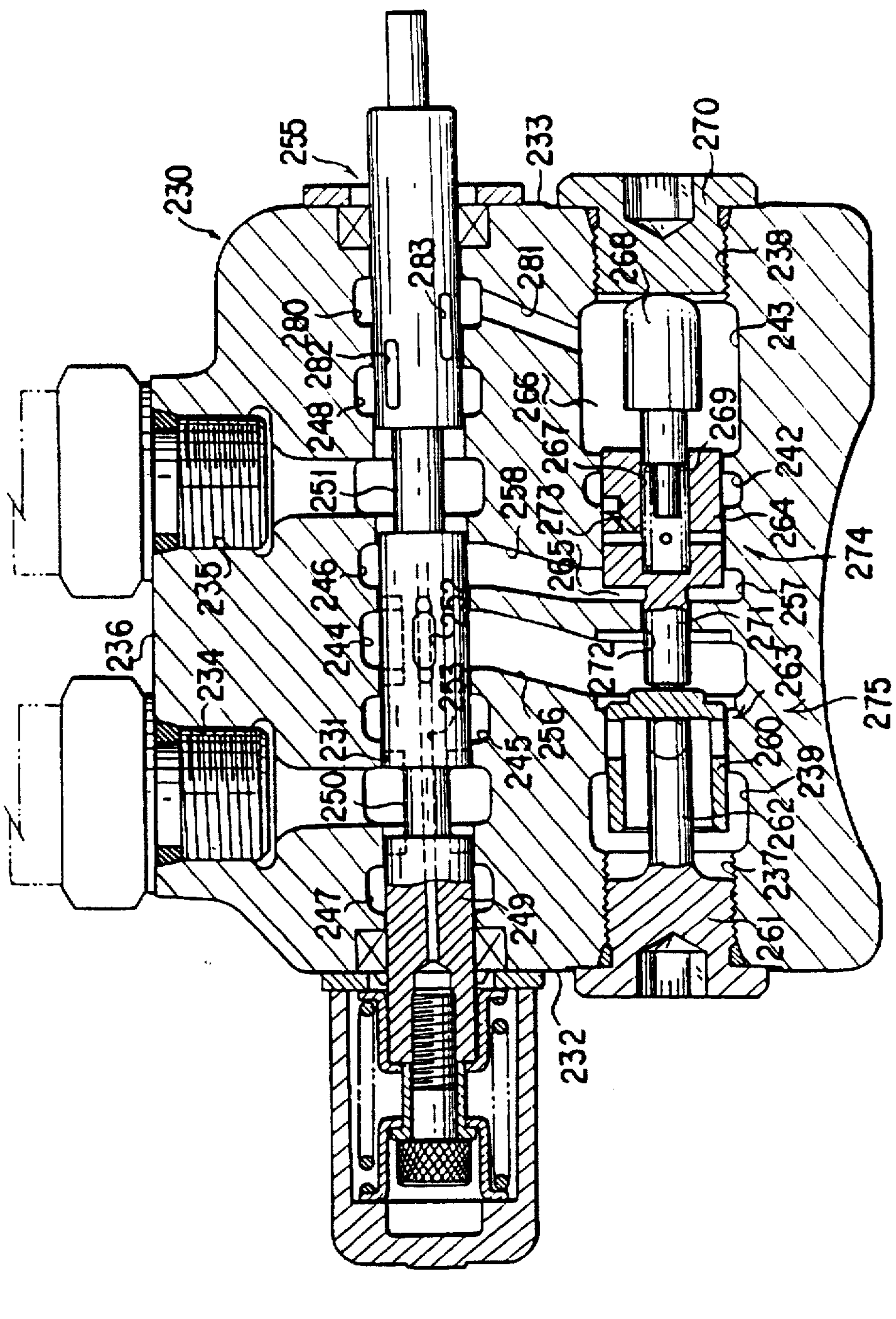
FIG. 10 is a section showing another embodiment of the direction control valve assembly.

A further embodiment of the direction control valve to be employed in the present invention will be discussed with reference to FIG. 10. Adjacent a second tank port 248 in a spool bore 231 of a valve block 230, a port 280 is formed. The port 280 is communicated with a second pressure chamber 266 via a fluid conduit 281. A main spool 249 is formed with first and second grooves 282, 283 communicated with the second tank port 248 and the port 280 in circumferentially spaced apart relationship.

The first groove 282 establishes communication between the second tank port 248 and the port 280 when the main spool 249 is shifted toward the right from the neutral position. The communication area is proportional to the shifting magnitude. The second groove 283 establishes communication between the port 280 and the second tank port 248 when the main spool 249 is shifted toward left from the neutral position. Also, the communication area is proportional to the shifting magnitude.

With the construction set forth above, when the main spool 249 is shifted toward the right from the neutral position, the second tank port 248 and the port 280 are communicated via the first groove 282 to establish communication between the second pressure chamber 266 and the second tank port 248. Therefore, a part of the pressurized fluid in the second pressure chamber 266 flows to the tank to prevent abrupt increase of the pump discharge amount to improve anti-vibration characteristics.

With the construction set forth above, since the main spool 249 of the direction control valve and the check valve portion 263 and the pressure reduction valve portion 274 of the pressure compensation valve 275 are assembled in the valve block, the pressure compensation type direction control valve assembly can be made compact. Also, since the second pressure chamber 266 of the pressure reduction valve portion 274 and the tank port are communicated by shifting of the main spool 249 to flow a part of pressurized fluid in the second pressure chamber 266 to the tank, an abrupt increase of the pump discharge amount is prevented to improve anti-vibration characteristics.

Here, in the above-mentioned embodiment of the pressurized fluid supply system, if an unload valve is employed, a greater load pressure of one of the actuators among a plurality of actuators is supplied to one of the pressure receiving portion of the unload valve via a load pressure detection conduit to push toward an on-load position together with a spring force of a spring. Then, the pump discharge pressure P2 is supplied to the other pressure receiving portion to cause biasing force toward the unload position. By this, a part of the pump discharged pressurized fluid is unloaded to the tank depending upon the load pressure to maintain the pump discharge pressure at a pressure level slightly higher than the load pressure.

However, an engine revolution speed for driving the pump is maintained constant, and at both the neutral position and the supply position, the engine speed becomes constant. Therefore, at the neutral position of the direction control valve, the majority of the pump discharged fluid flows to the tank via the unload valve to cause substantial energy loss.

Figure 11:
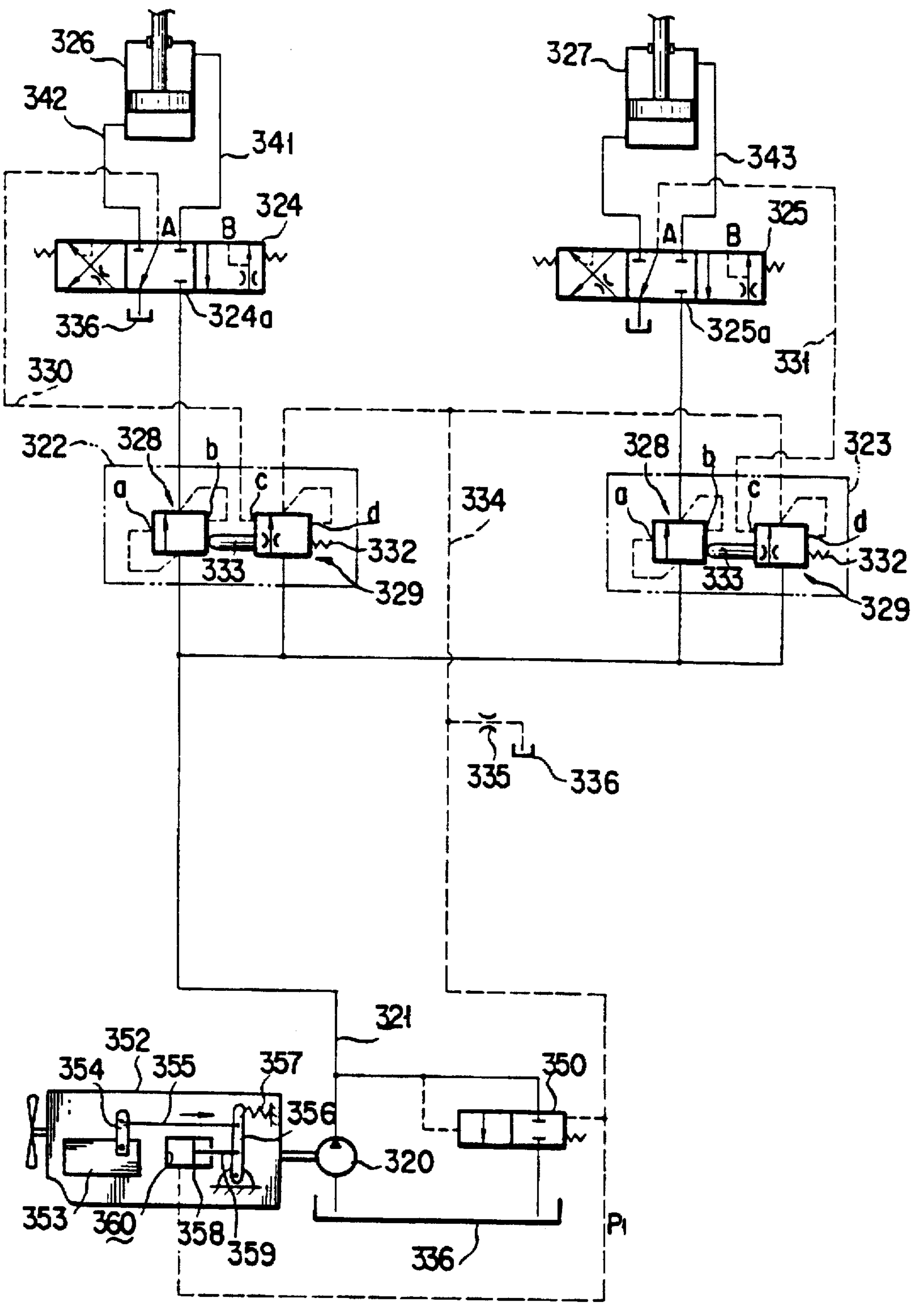
FIG. 11 is a hydraulic circuit diagram of another embodiment of the pressurized fluid supply system according to the present invention.

A construction of the pressurized fluid supply system according to the present invention employing the unload valve for solving the problem as set forth above, is illustrated in FIG. 11. As shown in FIG. 11, a vehicular engine 352 includes a fuel injection pump 353 which has a control lever 354 connected to a lever 356 via a rod 355. The lever 356 is biased in one direction by the spring 357 to shift the control lever 356 in the direction for reducing the engine speed. To the lever 356, a piston rod 359 of the cylinder 358 is connected. An expansion chamber 360 of the cylinder is connected to a load detection conduit 334 to cause pivoting of the lever 356 in the other direction against the spring 357 to pivot the control lever 354 in a direction for increasing the engine speed.

Therefore, when the load pressure P1 in the load pressure detection conduit 334 is higher than or equal to a set pressure, the piston rod 359 of the cylinder 358 has a large expansion force so that the lever 356 is pivoted in the other direction against the spring 357 to pivot the control lever 354 in a direction for increasing the fuel injection amount to increase the engine speed.

When the load pressure P1 becomes lower than or equal to the set pressure, the expansion force on the piston rod 359 of the cylinder 358 becomes smaller so that the lever 356 is pivoted in one direction by the spring to pivot the control lever 354 in the direction for reducing the engine speed to thus reduce the fuel injection amount to decelerate the engine speed.

By this, the discharge amount of the pump 320 is reduced to reduce the unloading amount flowing from the unload valve 350 to the tank 336.

Figure 12:
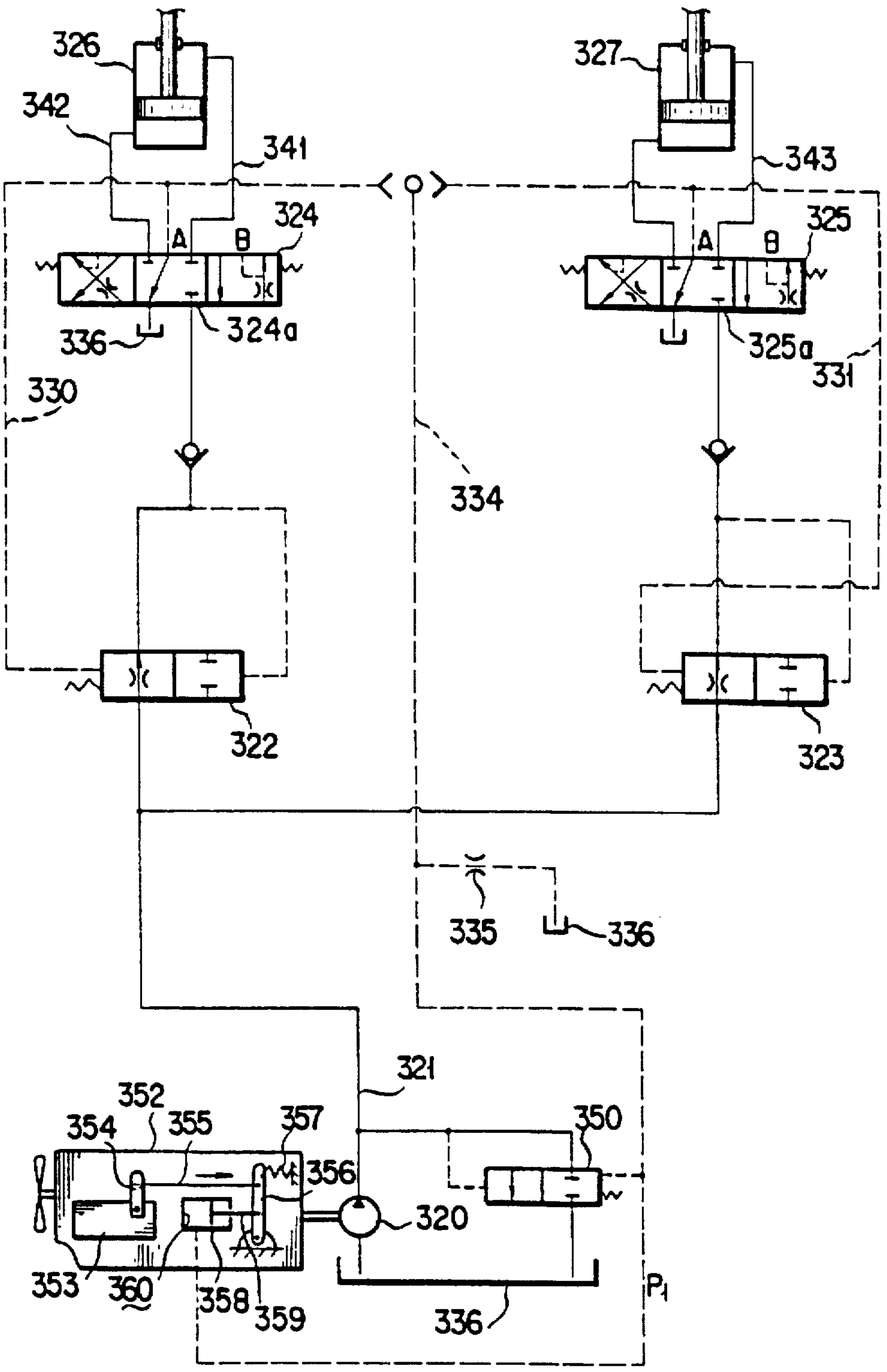
FIG. 12 is a hydraulic circuit diagram showing a modification of a hydraulic system of FIG. 11.
Figure 13:
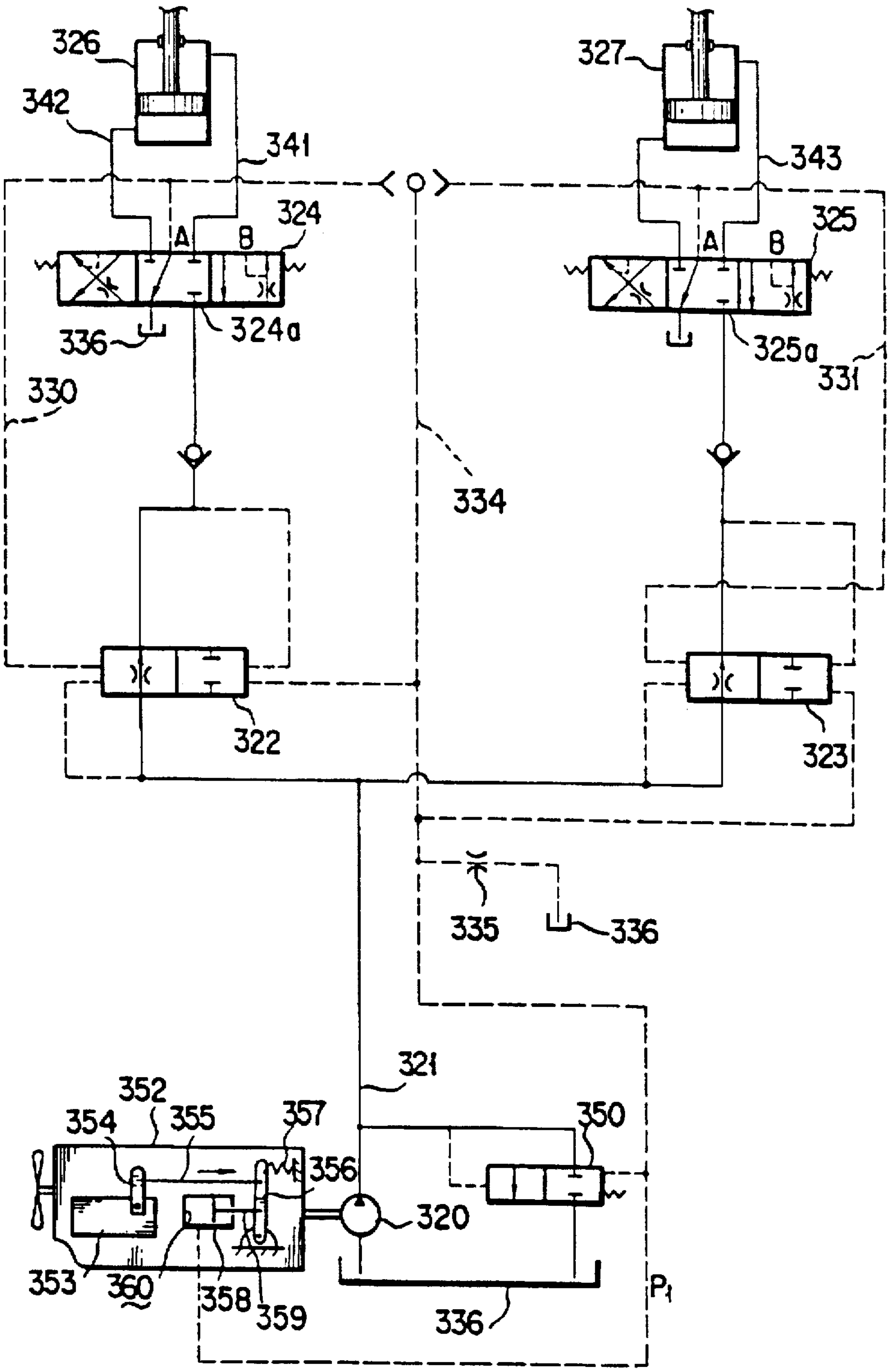
FIG. 13 is a hydraulic circuit diagram showing another modification of a hydraulic system of FIG. 11.
Figure 14:
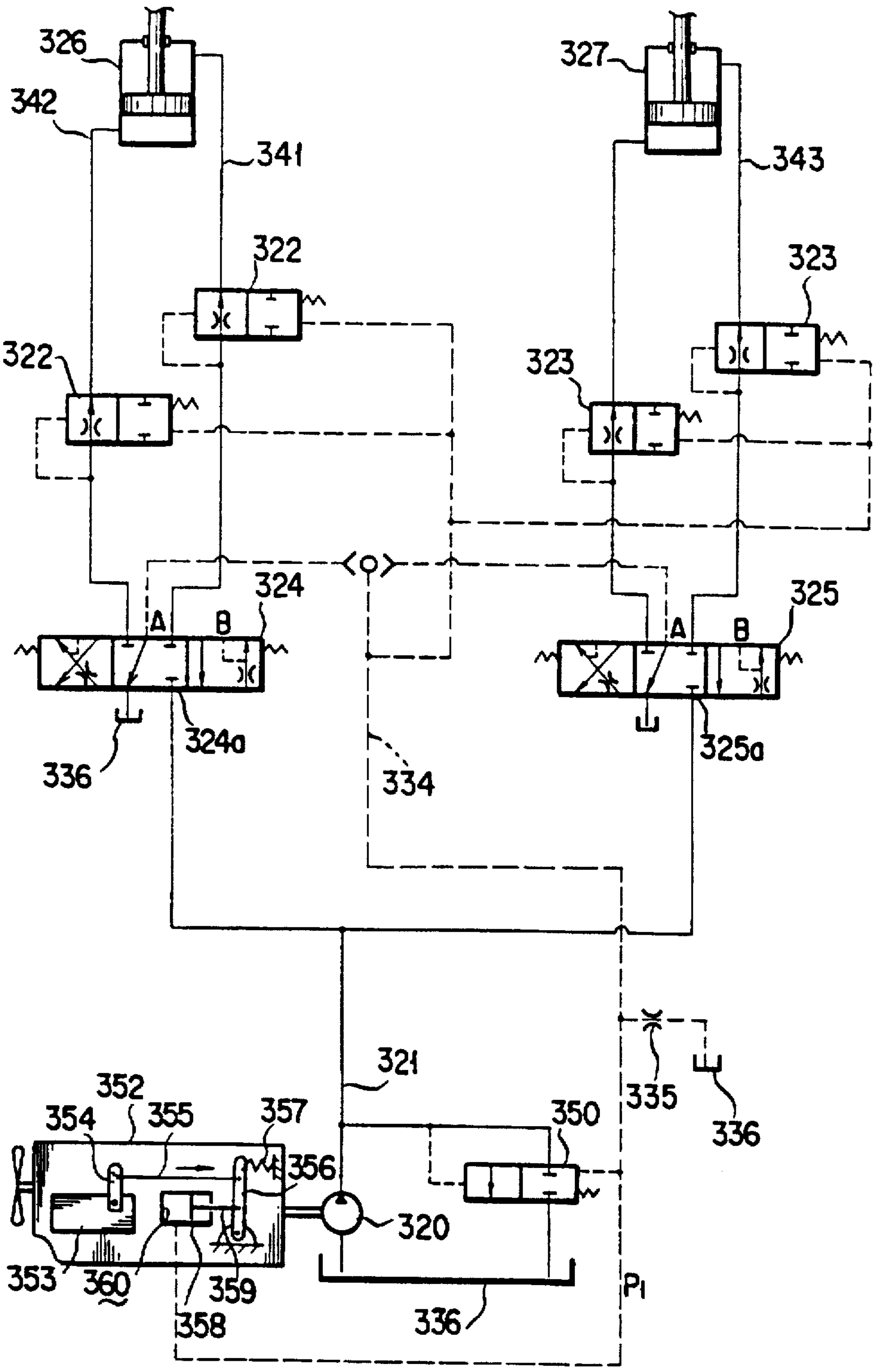
FIG. 14 is a hydraulic circuit diagram showing a further modification of a hydraulic system.

It should be noted that the pressure compensation valves 322 and 323 may be constructed as illustrated in FIGS. 12 and 13. Also, as shown in FIG. 14, the pressure compensation valves 322, 323 may be provided between the direction control valves 324, 325 and the actuators 326, 327, respectively.

In the foregoing embodiment, when the load pressure of the actuator is lower than or equal to the set pressure, the engine speed becomes low to reduce the discharge flow rate of the hydraulic pump 320 to reduce the flow rate to be unloaded to the tank 336 to reduce energy loss.

Figure 1:
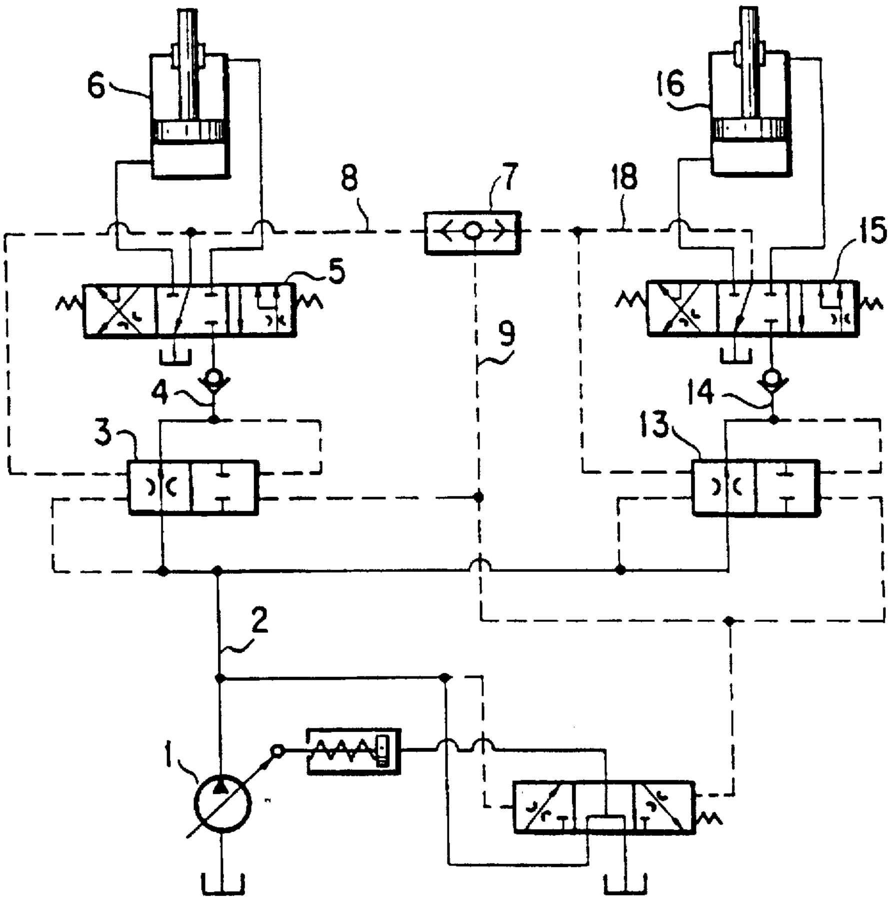
FIG. 1 (Prior Art)
FIG. 1 is a hydraulic system diagram showing one example of the conventional pressurized fluid supply system.
Figure 2:
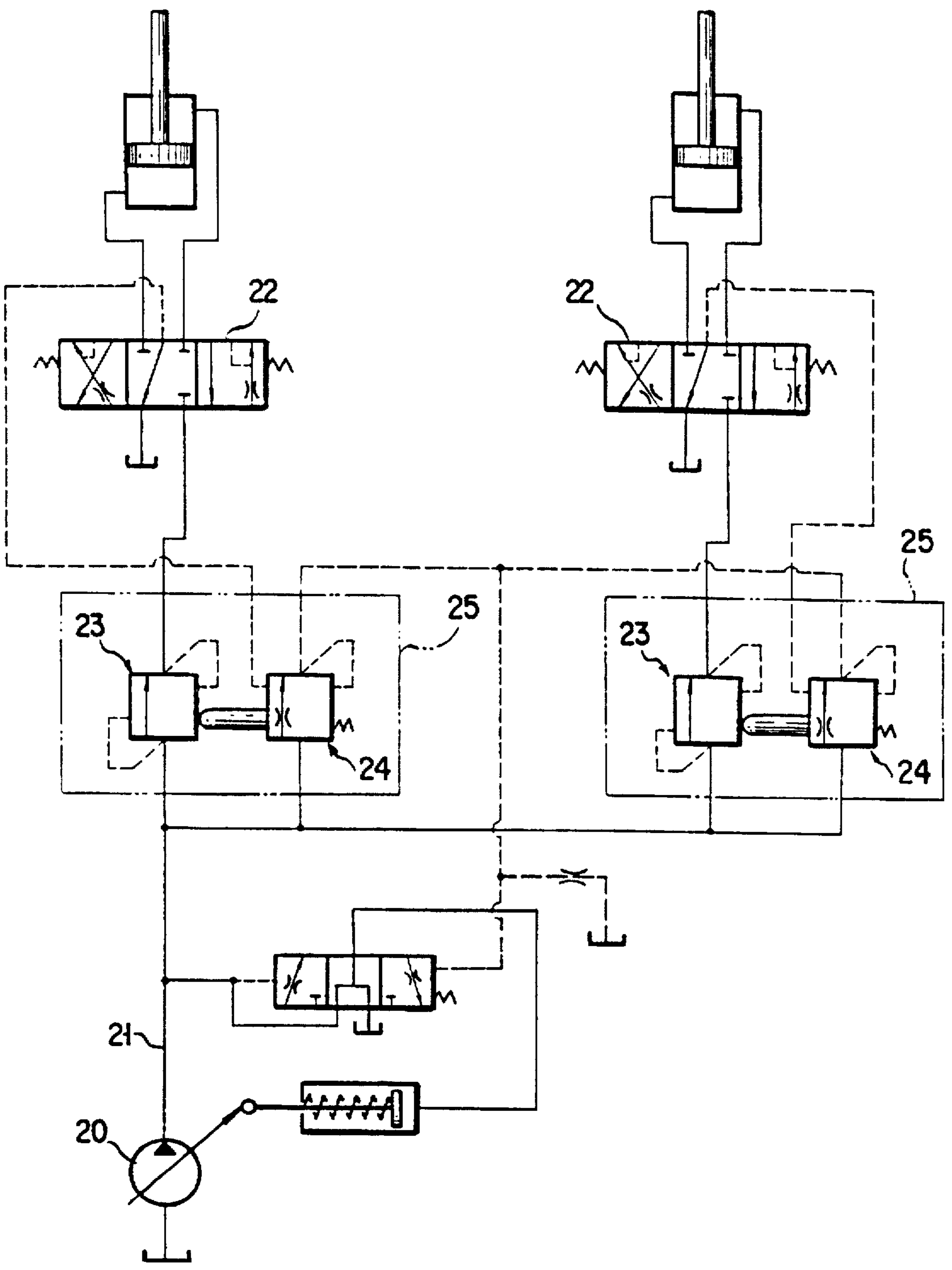
FIG. 2 is a hydraulic system diagram of the pressurized fluid supply system in the commonly owned prior application.

On the other hand, in the pressurized fluid supply system shown in FIG. 2, the pressure reducing portion of the pressure compensation valve connected to the higher pressure side actuator is pushed in the communicating direction away from the check valve position. Therefore, the pump discharge pressure is supplied to the inlet portion of the direction control valve through the check valve portion. Also, the output pressure of the pressure reduction valve portion becomes high pressure corresponding to the load pressure at the higher pressure side. On the other hand, the pressure reduction valve portion of the pressure compensation valve connected to the lower pressure side is depressed in the blocking direction by the output pressure of the pressure reduction valve portion to depress the check valve portion toward the closing side. Therefore, the output pressure of a check valve portion becomes the lower pressure than the pump discharge pressure in the extent corresponding to the difference of the load pressure. Thus, the discharged pressurized fluid of the hydraulic pump can be distributed to a plurality of actuators at a predetermined distribution ratio.

However, in such pressurized fluid supply system, the pressure for setting the pressure compensation valve, namely load detection pressure corresponding to the actuator load acting on the other pressure chamber of the pressure reduction valve portion, is generated from the pump discharge pressure via the pressure reduction portion, and the pump discharge pressure is set to be slightly higher than the load detection pressure. Therefore, when the load on the actuator is small and the load detection pressure is low, when respective direction control valves are in the neutral position and thus the load detection pressure is zero, the pump discharge pressure becomes low. At this condition, when the load on the actuator is abruptly increased to elevate the load detection pressure, it takes a long period to elevate the load detection pressure at the level corresponding to the load on the actuator to degrade response characteristics. This results in lag in actuation of the actuator.

Figure 15:
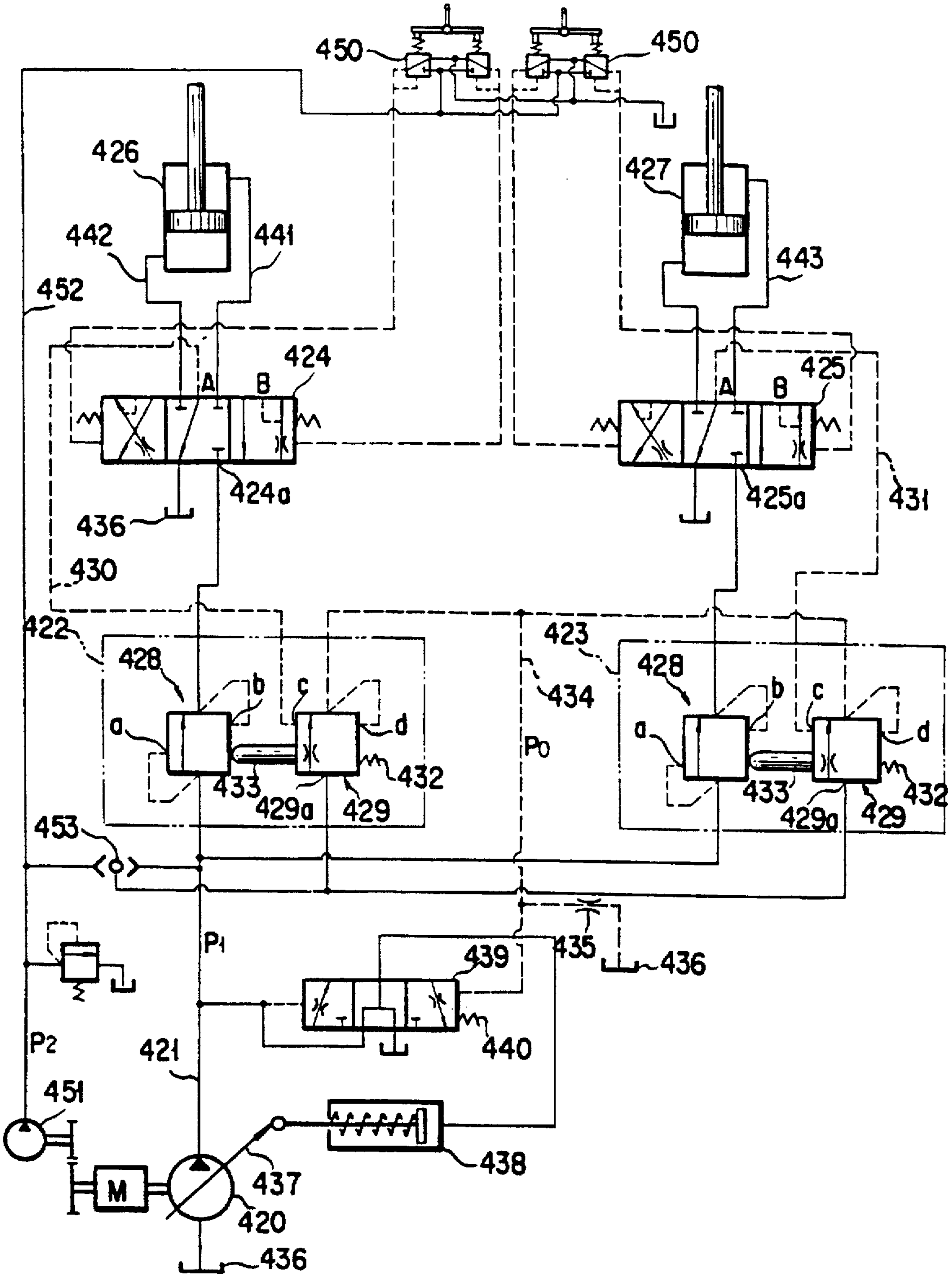
FIG. 15 is a hydraulic circuit diagram of a further embodiment of a hydraulic system according to the invention.

An embodiment for solving the above-mentioned problem is illustrated in FIG. 15. As shown in FIG. 15, in a discharge line 421 of a hydraulic pump 420, pressure compensation valves 422 and 423 are provided in parallel. At respective outlet sides of the pressure compensation valves 422, 423, actuators 426, 427 are connected via direction control valves 424, 425. Each pressure compensation valve 422, 423 comprises a check valve portion 428 and a pressure reduction valve portion 429. The check valve portion 428 is biased in the opening direction by the inlet pressure of the pressure chamber a and biased in closing direction by the outlet pressure of the pressure chamber b. The outlet side of the check valve portion 428 is connected to the inlet ports **424*a* and 425*a* of the direction control valve 424, 425. The pressure reduction valve 429 is biased in the opening direction by the load pressure of the own actuator introduced into the pressure chamber c through the load pressure induction lines 430, 431, and biased to closing direction by a weak spring 432 and the outlet pressure introduced into the pressure chamber d. Also, the pressure reduction valve portion 424 has a push rod 433 for pushing the check valve portion 428 in the closing direction. The outlet sides of respective pressure reduction valve portion 429 are communicated with load pressure detection line 434. The load detection line 434 is communicated with the tank 436 via a throttle 435**.

The hydraulic pump 420 is a variable displacement type pump. For an adjusting cylinder 438 for adjusting the angle of a swash plate 437, a pump discharge pressure is supplied by a direction control valve 439 for pump adjustment.

Furthermore, as shown in FIG. 15, the direction control valves 424, 425 are switched respectively by the discharge pressure of a pilot valve 450. To the pilot valve 450, a discharge line 452 of a pilot pump 451 is connected. The discharge pressure 452 of the pilot pump 451 and the discharge line 421 of the hydraulic pump 420 are respectively connected to inlet ports **429*a* of the pressure reduction valve portion 429 of respective pressure compensation valves 422, 423 via a high pressure preferential valve 453**.

The basic operation of the pressurized fluid supply system constructed as set forth above performs substantially the same as those of the pressure fluid supply system. Therefore, the discussion of the basic operation is neglected for avoiding redundancy.

Next, the unique operation of the present embodiment will be discussed hereinafter.

When the discharge pressure P1 of the hydraulic pump 420 is lower than the discharge pressure P2 of the pilot pump 451, the discharge pressure P2 may be supplied to the inlet port **429*a* of each pressure reduction valve portion 429. Therefore, when the load of the actuators 426, 427** is abruptly increased, the load detection pressure P0 can be quickly raised.

For instance, when the direction control valves 424, 425 as discussed above are in the neutral position A, the pump discharge pressure P1 of the hydraulic pump 420 is low pressure at 20 $kg/cm^2$. At this time, the discharge pressure P1, of the hydraulic pump 451 for pilot pressure is high pressure at 30 $kg/cm^2$. Since the detected load pressure P0 is risen to the predetermined pressure from the discharge pressure P2, the pressure can be raised in a short period.

Figure 16:
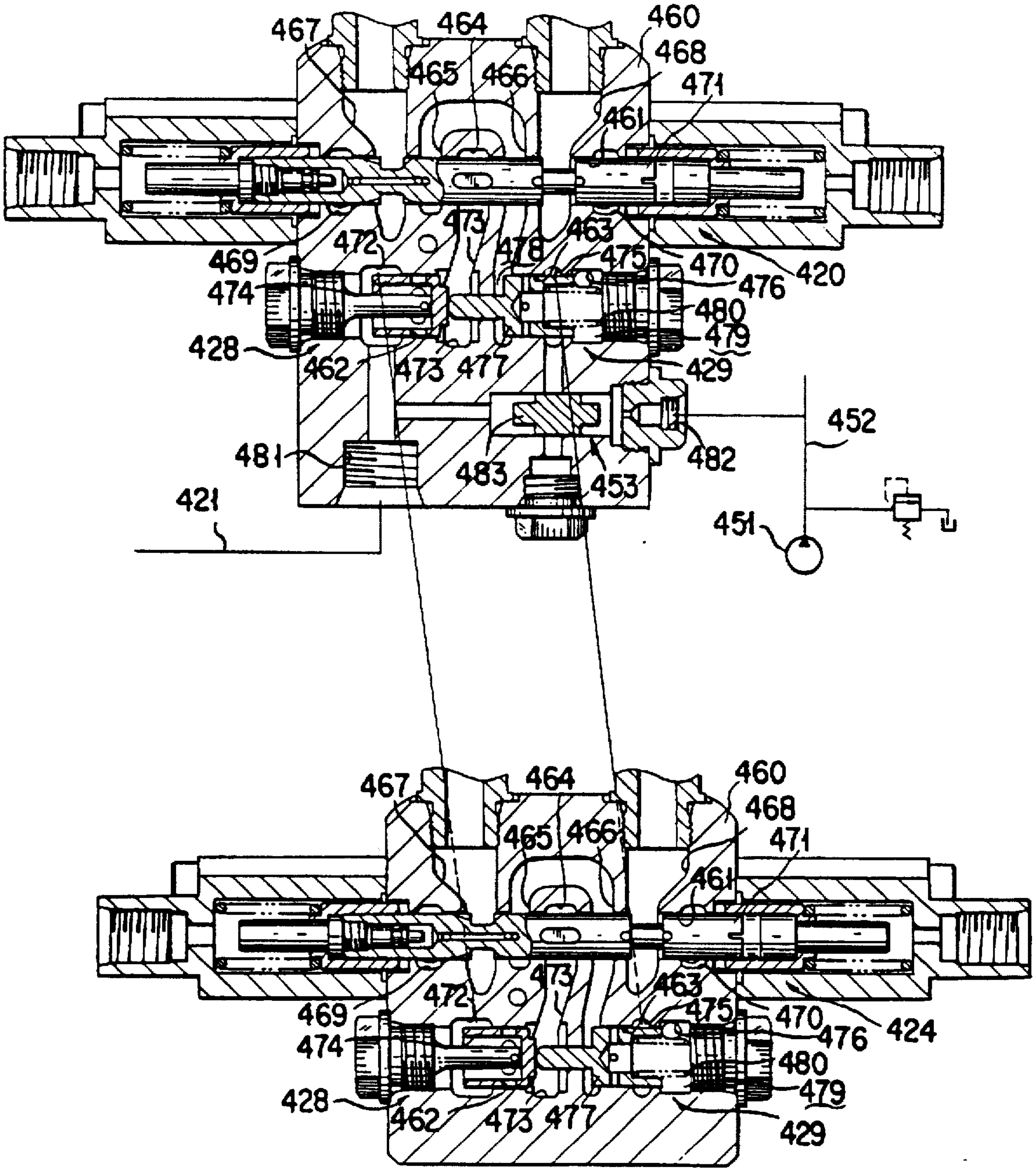
FIG. 16 is a section showing a connection of direction control valves.

FIG. 16 shows a concrete construction of the shown embodiment. A valve block 460 is formed with the spool bore 461, a check valve receptacle bore 462 and a pressure reduction valve receptacle bore 463. The valve block 460 is formed with an inlet port 464, first and second load pressure detection ports 465, 466, first and second actuator ports 467, 468 and first and second tank ports 469, 470, respectively, opening to the spool bore 461. A main spool 471 is disposed in the spool bore 461 to establish and block communication between the ports. Thus, the direction control valves 424 and 425 are formed. For the valve block 460, a first port 472 opening to the inlet port 464 and fluid passage 473 communicating the check valve receptacle bore 462 with the inlet port 473 are formed. For the check valve bore 462, a spool 474 is inserted for establishing and blocking communication between the first port 472 and the fluid passage 473, and is to be stopped at the blocking position, to form the check valve portion 428. The valve block 460 is further formed with second and third ports 475, 476 opening to the pressure reduction valve receptacle bore 463. The pressure reduction valve receptacle bore 463 receives a spool 477 to form a first pressure chamber 478 and a second pressure chamber 479. The first pressure chamber 478 is communicated with the second load pressure detection port 466 and the second pressure chamber is communicated with the third port 476. The spool 477 is biased to one direction by means of a spring 480 to depress the spool 474 of the check valve portion 428 to the closing position. Thus, the pressure reduction valve portion 429 is formed.

A pump port 481 and an auxiliary port 482 are formed in one valve block 460. The pump port 481 is communicated with the first port 472. Also, the pump port 481 and the auxiliary port 482 are connected to the second port 475 via a shuttle valve 483.

Then, by coupling respective valve blocks 460, respective first ports 472 are communicated. Also, the second ports 475 and the third ports 476 are communicated respectively. The discharge line 421 of the hydraulic pump 420 is connected to the pump port 481 and the discharge port 452 of the pilot pump 451 is connected to the auxiliary port 482.

With the construction set forth above, the pressure reduction valve portion of the pressure compensation valve connected to the higher pressure side actuator is depressed in a communicating direction away from the check valve portion. Therefore, the pump discharge pressure is supplied to the inlet port of the direction control valve via the check valve portion. In conjunction therewith, the output pressure of the pressure reduction valve portion becomes high pressure corresponding to the load pressure at the higher pressure side. The pressure reduction valve portion of the pressure compensation valve connected to the lower pressure side actuator is depressed in the blocking direction by the output pressure of the pressure reduction valve portion to push the check valve portion in the closing direction. Therefore, the output pressure of the check valve becomes lower than the discharge pressure of the hydraulic pump in the extent corresponding to the load pressure difference. By this, the discharged pressurized fluid of one hydraulic pump can be distributed to a plurality of actuators at different pressure levels corresponding to the load pressure. Furthermore, since the shuttle valve which is otherwise required for comparing the load pressure of the actuators, becomes unnecessary, the cost is lowered. Furthermore, even when the actuator at the higher pressure side is varied to cause variation of the load pressure acting in one pressure chamber c of the pressure reduction valve portion, natural drop of the actuator may not be caused in the actuator.

Also, since the pressurized fluid at higher pressure among the discharge pressure of the hydraulic pump and the high pressure fluid of the other hydraulic pressure source is applied to the inlet side of the pressure reduction valve portion, the load detection pressure can be raised in a short period even when the discharged pressure of the hydraulic pump is low to improve sensitivity to the load detection pressure.

On the other hand, concerning the construction and function of the pressure compensation valve, the check valve portion has a function for blocking the return fluid from the actuator due to external load acting on the actuator so that the actuator may not be actuated, namely has a load check function. The pressure in the closing direction at the active state of the load check function is the pressure within the inlet side line of the direction switching valve. Therefore, the return fluid from the actuator flows through a metering portion of the direction switching valve, and the actuator may be actuated in the magnitude corresponding to the flow rate to lower the precision of the load check function.

Figure 17:
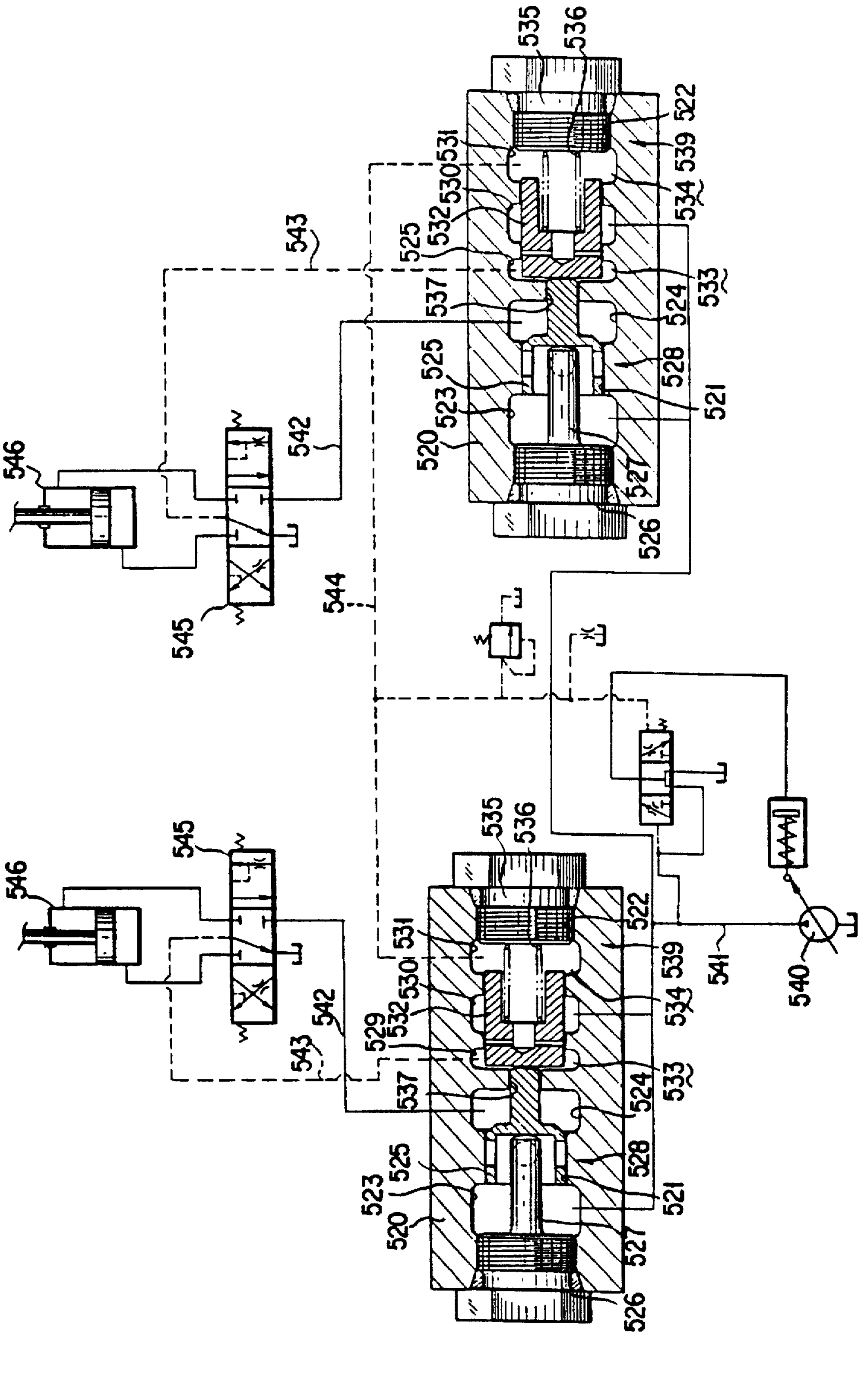
FIG. 17 is a hydraulic circuit diagram of a still further embodiment of the pressurized fluid supply system according to the present invention, in which the pressure compensation valve is illustrated in section.

Therefore, in the construction of the pressure compensation valve shown in FIG. 17, a valve body 520 is formed with a one side bore 521 and the other side bore 522 in mutually opposing relationship. To the one side bore 521, an inlet port 523 and an output port 524 are formed. Also, a valve 525 is disposed within the one side bore 521. The valve 525 is provided with a stopper rod 527 so as to restrict movement in the leftward direction beyond the illustrated position. With the construction set forth above, the check valve portion 528 is constructed.

In the other side bore 522, first, second and third ports 529, 530 and 531 are formed, and a spool 532 is disposed to define a first pressure chamber 533 opening to the first port 529 and a second pressure chamber 534 opening to the third port 531. The spool 532 is biased by a spring 536 disposed between the plug 535 and the spool 532 toward left to contact with a push rod 538 integrally provided with the valve 525 and extending from a through opening 537. Thus, the valve 525 is contacted with the stopper 527 to block respective ports. When the spool 532 is moved toward right by the pressure within the first pressure chamber 533, the second and third ports 530 and the third port 531 are communicated to form the pressure reduction valve 539.

The inlet port 523 and the second port 530 are connected to the pump discharge line 541 of the hydraulic pump 540 to be supplied the discharge pressure of the pump. The outlet port 524 is connected to a supply line 542. The first port 529 is connected to the load pressure introduction line 543 to be supplied a first control pressure. The third port 551 is connected to the load pressure detection line 554 to be supplied the second control pressure. It should be noted that 545 denotes a direction switching valve and 556 is an actuator.

With the construction set forth above, when the discharge pressure of the hydraulic pump 540 is low and the pressures in the load pressure detection line 544 are zero, the valve 525 and the spool 532 are placed at the position illustrated in FIG. 17. With the pressure in the load pressure introduction line 543 and the supply line 542, the valve 525 is slidingly driven to block communication between the outlet port 524 and the inlet port 523 to prevent surge flow. At this condition, a holding pressure is generated in the actuator 546 by the external load. The return fluid thus caused by the holding pressure is introduced into the first port 529 via the load pressure introducing line 543. Thus, the valve body 525 is depressed to prevent surge flow. Therefore, no return fluid will flow through the metering portion of the valve 525 to improve precision in the load checking function.

On the other hand, in the pressure compensation valve in the foregoing embodiments of FIGS. 1 to 17, if the pressure in the first pressure chamber is higher than the pressure in the second pressure chamber, the spool is shifted away from the valve. Then, the pressure at the inlet port and the pressure in the outlet port becomes equal to each other. Also, the pressure in the first pressure chamber becomes equal to the pressure of the second pressure chamber. On the other hand, when the pressure in the first pressure chamber is lower than the pressure in the second pressure chamber, the spool pushes the valve in the blocking direction so that the pressure at the outlet port is lower than the pressure in the inlet port in the extent corresponding to the pressure difference between the second pressure chamber and the first pressure chamber. Therefore, by providing the pressure compensation valve in the hydraulic circuit which distributes the discharged pressurized fluid of the hydraulic motor to a plurality of actuators by the direction control valve, it becomes possible to distribute the discharged pressurized fluid of the single hydraulic pump to a plurality of actuators without a shuttle valve. In such construction, since the diameter of the valve and the diameter of the spool in the pressure compensation valve portion are the same, the force to push the spool by the pressure difference between the first and second pressure chambers and the force to push the valve by the pressure difference between the inlet port and the outlet port becomes equal so that the predetermined distribution rate is maintained at respective spool irrespective of the load acting on the actuators.

Therefore, when the actuators are left and right hydraulic motors for traveling, for example, the load acting on left and right traveling hydraulic motors are the same during straight traveling to have the same load pressure. At this condition, no problem will arise even when the equal flow rate is applied to the left and right traveling hydraulic motors. However, in left or right turn, despite the fact that turning will become easier when the revolution speed of the traveling hydraulic motor at the opposite side to the turning direction is higher, the equal flow rate is supplied to the left and right traveling hydraulic motors to drive the left and right traveling hydraulic motors at an equal speed to make turning difficult.

Figure 18:
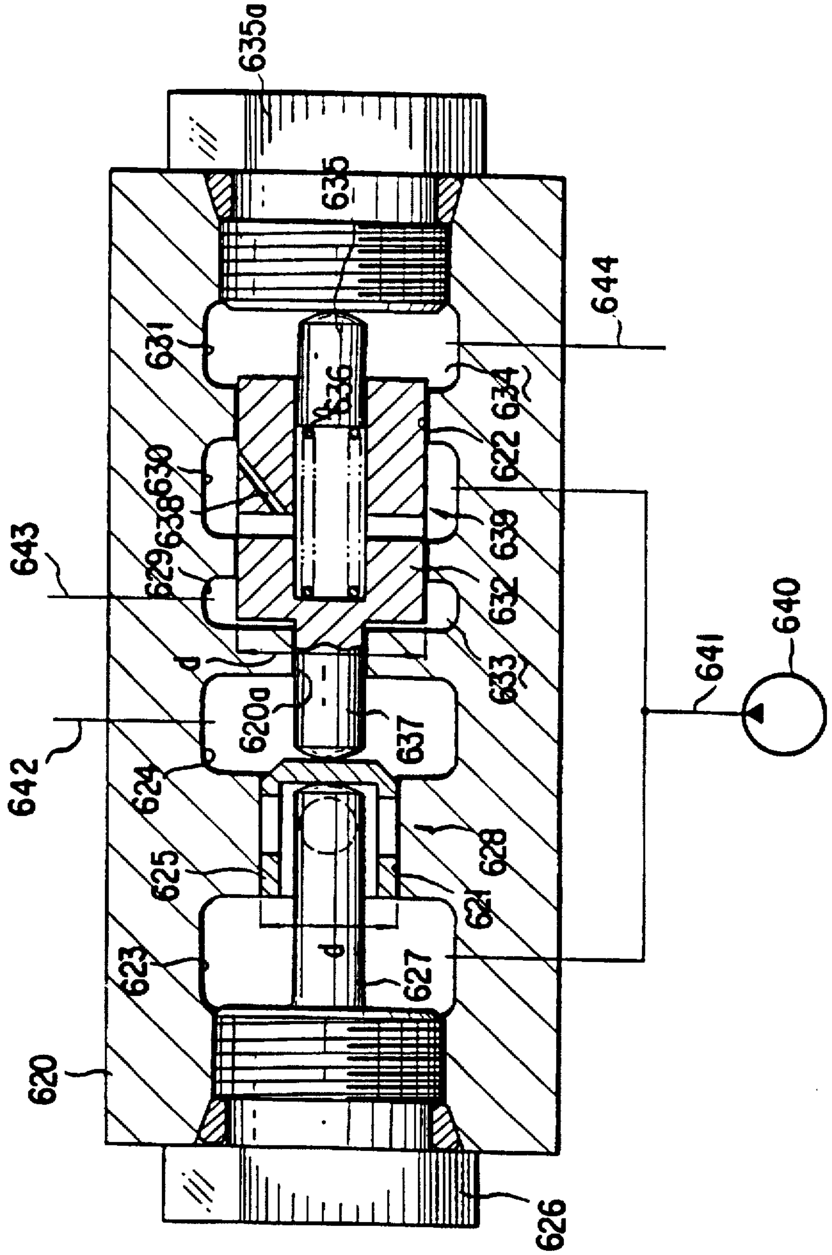
FIG. 18 is a section of the pressure compensation valve.

An embodiment of the pressurized fluid supply system for solving this problem is illustrated in FIG. 18. A valve body 620 is formed with one side bore 621 and the other side bore 622 in mutually opposing relationship. In one side bore 621, an inlet port 623 and an outlet port 624 are formed. A valve 625 is disposed within the one side bore 621. The valve 625 is restricted in sliding motion toward left beyond the shown position by a stopper rod 627 provided on a plug 626 to form a check valve portion 628. In the other side bore 622, first, second and third ports 629, 630, 631 are formed. A spool 632 is disposed in the other side bore 622 to define a first pressure chamber opening to the first port 629 and a second pressure chamber 634 opening to the third port 631. The spool 632 is biased toward the left by a spring 636 provided between the piston 635 and the spool 632 so that a push rod 637 provided integrally with the spool 632 extends through a through opening 620*a* to depress the valve 625 into the stopper rod 627 to block respective ports. The pressure in the first pressure chamber 633 acts on the spool 632 to slide the latter toward the right to establish communication between the second port 630 and the third port 631 by a fluid passage 638. Thus, the pressure reduction valve portion 639 is formed. The piston 635 is held in contact with the plug 635*a*.

The diameter d1 of the valve 625 is smaller than the diameter d2 of the spool.

The inlet port 623 and the second port 630 are connected to the pump discharge line 641 of a hydraulic pump 640 to be supplied the pump discharge pressure. The output port 624 is connected to the supply line 642. The first port 629 is connected to a load pressure introduction line 643 to be supplied the first control pressure. The third port 663 is connected to the load pressure detecting line 644 to be supplied the second control pressure.

Next, operation will be discussed.

When the discharge pressure of the hydraulic pump is low and the pressure in the load pressure introduction line 643 and the load pressure detecting line 644 are zero, the valve 625 and the spool 632 are placed at the positions illustrated in FIG. 18 so that the valve 625 is driven to slide by the pressure of the supply line 624 to block communication between the outlet port 624 and the inlet port 623 to prevent surge flow.

When the discharge pressure of the hydraulic pump 640 rises, the valve 625 is biased to establish communication between the inlet port 623 and the outlet port 624 and the pressurized fluid is supplied to the supply line 642. When the valve 625 is further slidingly shifted to the stroke end, the second port 630 is communicated with the third port 631.

At the above-mentioned condition, if the first control pressure (the pressure of the first pressure chamber 633) is higher than the second control pressure (the pressure in the second pressure chamber 634), the spool 632 is biased toward the right to establish communication between the first port 630 and the third port 631 via the fluid passage 638. Therefore, the third port pressure, namely the second control pressure, becomes a pressure corresponding to the first control pressure so that the pump discharge pressure and the supply pressure of the supply line 642 become equal to each other.

On the other hand, in the condition set forth above, if the second control pressure (the pressure of the second pressure chamber 634) is higher than the first control pressure (the pressure in the first pressure chamber 633), the spool 632 is biased toward left to block communication between the second port 630 and the third port 631. Thus, the valve 625 is depressed in the direction for blocking communication between the inlet port 623 and the outlet port 624 by the push rod 637 to make the opening area between the inlet port 623 and the outlet port 624 become smaller to further lower the pump discharge pressure.

Thus, when the first control pressure to be supplied to the first pressure chamber 633 of the pressure reduction valve portion 639 is higher than the second control pressure to be supplied to the second pressure chamber 634, the second port 630 and the third port are communicated to reduce the pump discharge pressure so that the pressure (second control pressure) of the third port 631 becomes equal to the pressure (first control pressure) of the first port 629. Also, the pressure (pump discharge pressure) of the inlet port 623 and the pressure (supply pressure) in the outlet port 624 become equal to each other.

Similarly, when the second control pressure is higher than the first control pressure, the second and third ports 630 and 631 are not communicated so that the pump discharge pressure may not be supplied to the third port 631. Also, by the valve 625, the opening areas of the inlet port 623 and the outlet port are reduced so that the supply pressure becomes lower than the pump discharge pressure in the extent corresponding to the pressure difference between the second control pressure and the first control pressure.

As set forth above, as shown in FIG. 18, the hydraulic circuit supplying discharged pressurized fluid of the single hydraulic pump 640 is distributed to a plurality of actuators, the supply line 642 is connected to the inlet port of the direction control valve 646, and the load pressure of the own actuator is introduced into the load pressure introduction line 643. Then, the load pressure detecting lines 644 are communicated per respective pressure compensation valves, and the distribution of the pressurized fluid to respective actuators comparable to the prior art can be achieved. The foregoing discussion is the same as the prior art, and in the shown embodiment, the diameter d1 of the valve 625 is made smaller than the diameter d2 of the spool 633. Therefore, when the load on the actuator 645 is different to differentiate the own load pressure, the open areas of the inlet port 623 and the outlet port 624 of the pressure compensation valve having lower own load pressure becomes smaller than that in the prior art to supply a smaller amount of the pressurized fluid.

Figure 19:
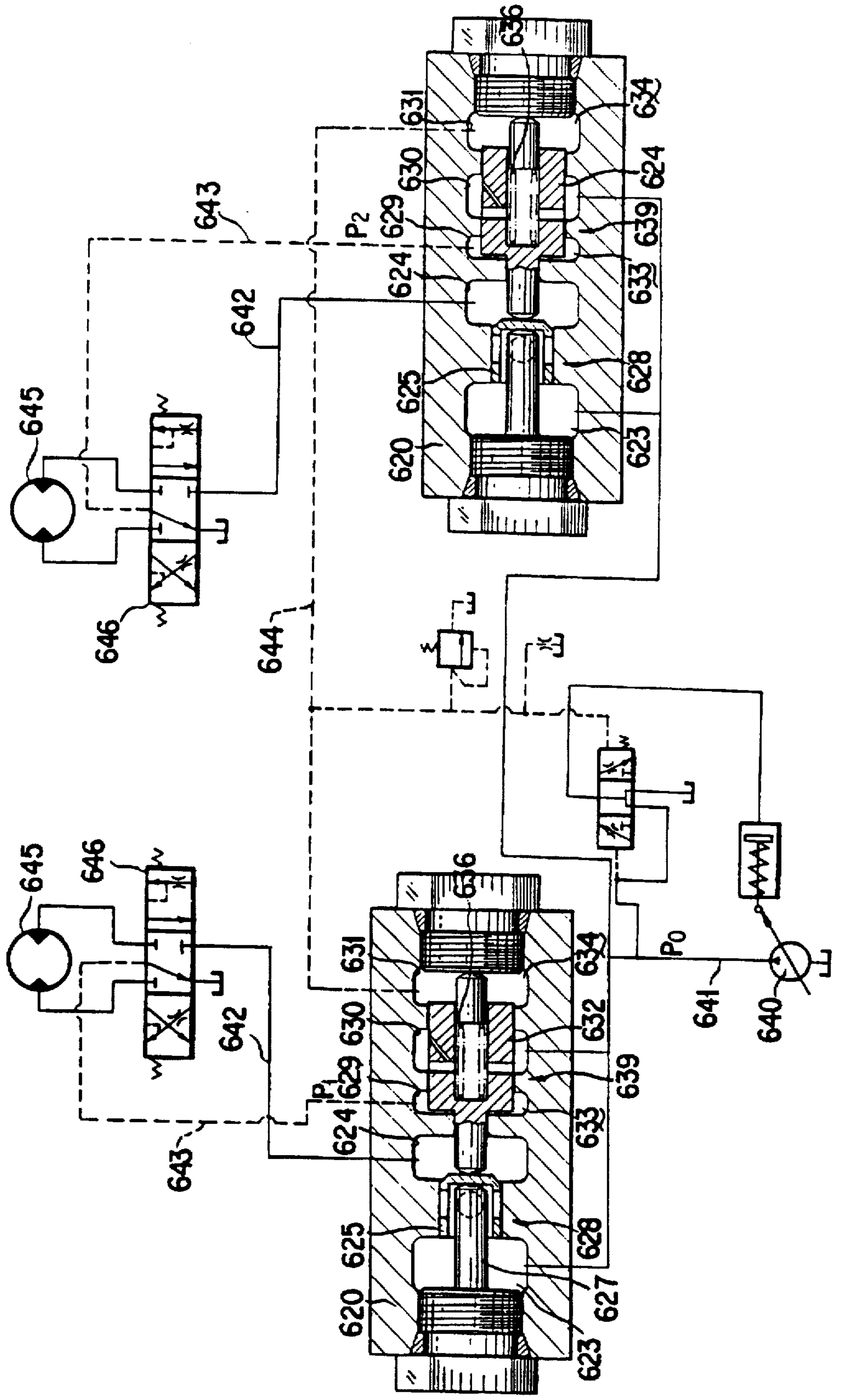
FIG. 19 is a hydraulic circuit diagram of a yet further embodiment of the pressurized fluid supply system according to the present invention, in which the pressure compensation valve is illustrated in section.

For example, in FIG. 19, when the left side actuator 645 is a left side traveling hydraulic motor and the right side actuator 645 is a right side traveling hydraulic motor, and when a right turn is to be made, the load on the left side traveling hydraulic motor becomes greater than that of the right side traveling hydraulic motor. Therefore, the own load pressure at the left side becomes greater than the own load pressure at the right side. Therefore, the open area of the valve 625 of the right side pressure compensation valve becomes smaller than that of the left side pressure compensation valve so that the discharge pressure of the hydraulic pump 640 is distributed to the right side pressure compensation valve at a smaller proportion to that of the left side. Therefore, the left side traveling hydraulic motor is driven at higher revolution speed than the right side traveling hydraulic motor to make right turn easier.

When the pressure of the first pressure chamber 633 is higher than the pressure in the second pressure chamber 634, the spool 632 us moved away from the valve to make the pressure at the inlet port 623 equal to the pressure at the outlet port 624. At the same time, the pressure of the first pressure chamber 633 and the pressure of the second pressure chamber 634 becomes equal to each other. When the pressure of the first pressure chamber 633 is lower than the pressure of the second pressure chamber 634, the valve 625 is depressed in the blocking direction by the spool 632 so that the pressure at the outlet port 624 becomes lower than the pressure in the inlet port 623 in the extent corresponding to the pressure difference between the second pressure chamber 634 and the first pressure chamber 633. Also, the open areas of the inlet port 623 and the outlet port 624 become smaller in proportion to the pressure difference between the pressure in the second pressure chamber 634 and the pressure in the first pressure chamber 633.

Also, by providing the pressure compensation valve in the hydraulic circuit supplying discharge pressure of the hydraulic pump to a plurality of actuators, the discharge pressure in the single hydraulic pump can be distributed to a plurality of actuators at a controlled flow rate without employing the shuttle valve. Also, the greater amount of pressurized fluid can be supplied to the actuator having higher load pressure.

On the other hand, in the foregoing pressure compensation valve, since the setting of the pressure compensation characteristics can determined by the pressure in the first pressure chamber and the pressure in the second pressure chamber, the pressure compensation characteristics corresponding to the kind of actuators cannot be provided.

Figure 20:
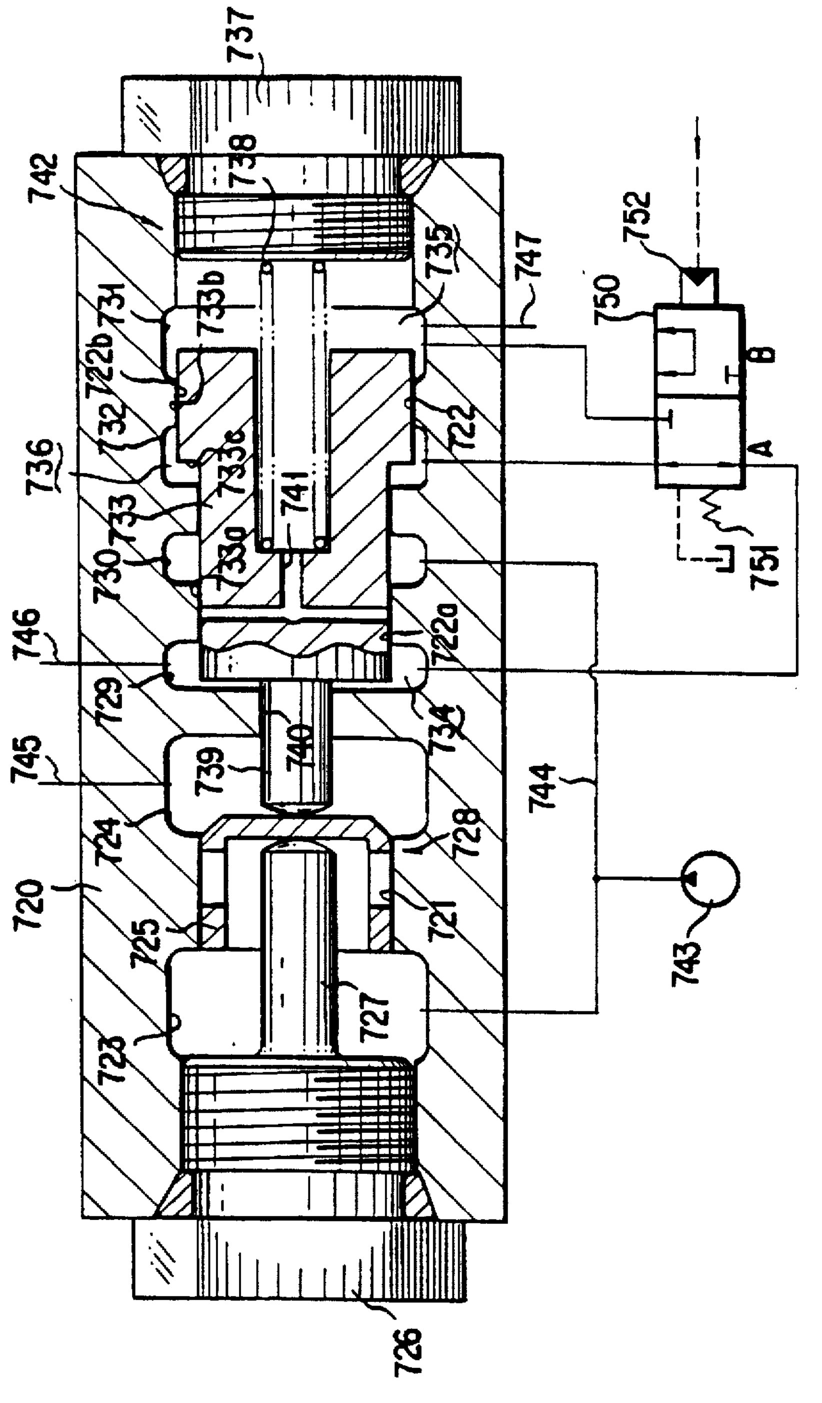
FIGS. 20 and 21 are section of the pressure compensation valve.

Therefore, in the embodiment of the present invention as illustrated in FIG. 20, a pressurized fluid supply system which is variable of pressure compensation characteristics depending upon the kinds of the actuator can be provided.

As shown in FIG. 20, a valve body 720 is formed with one side bore 721 and the other side bore 722 in opposition to each other. One side bore 721 is formed with an inlet port 723 and an outlet port 724. A valve 725 is disposed in the one side bore 721. The valve 725 is restricted in sliding motion toward the left beyond the shown position by a stopper rod 727 provided in the plug 726. Thus, the check valve portion 728 is formed.

The other side bore 722 comprises a smaller diameter bore **722*a* and a larger diameter bore 722*b*. In the smaller diameter bore 722*a*, first and second ports 729, 730 are formed. On the other hand, in the large diameter bore 722*b*, a third port 731 is formed. Over the smaller diameter bore 722*a* and the larger diameter bore 722*b*, a fourth port 732 is formed. The spool 733 includes a smaller diameter portion 733*a*, a larger diameter portion 733*b* and a step portion 733*c*. The spool 733 is disposed in the other side bore 722 to define a first pressure chamber 734 opening to the first port 729, a second pressure chamber 735 opening to the third port 736, and a third pressure chamber opening to the fourth port 732. The spool 733 is biased toward the left by a spring 738 provided between the spool 733 and the plug 737. A push rod 739 provided integrally with the spool 733 extends through a through opening 740 to project therefrom to abut the valve 725 onto the stopper rod 727, and blocks communication at respective ports. With the pressure in the first pressure chamber 734, the spool 733 is caused sliding motion toward the right to establish communication between the second port 730 and the third port 731 via a fluid passage 741. Thus, the pressure reduction valve portion 742** is formed.

The inlet port 723 and the second port 730 are connected to a pump discharge line 744 of a hydraulic pump 743 to be supplied the pump discharge pressure. The outlet port 724 is connected to a supply line 745. The first port 729 is connected to a load pressure introduction line 746 to receive the first control pressure therefrom. The third port 731 is connected to a load pressure detecting line 747 to be supplied the second control pressure.

The first port 729, the fourth port 732 and the third port 731 are communicated and blocked by a switching valve 750. The switching valve 750 is maintained at a first position A by means of a spring 751 to establish communication between the first port 729 and the fourth port 732. The pressurized fluid at a pressure receiving portion 752 switches the switching valve 720 at a second position B to establish communication between the third port 731 and the fourth port 732.

Next, operation will be discussed.

When the pump discharge pressure of the hydraulic pump 743 is low and the pressures in the load pressure introduction line 746, and the load pressure detecting line 747 are zero, the spool 733 is placed at the position of FIG. 20 to slide the valve 725 with the pressure in the supply line 745 to block communication between the outlet port 724 and the inlet port 723 to avoid surge flow.

Figure 21:
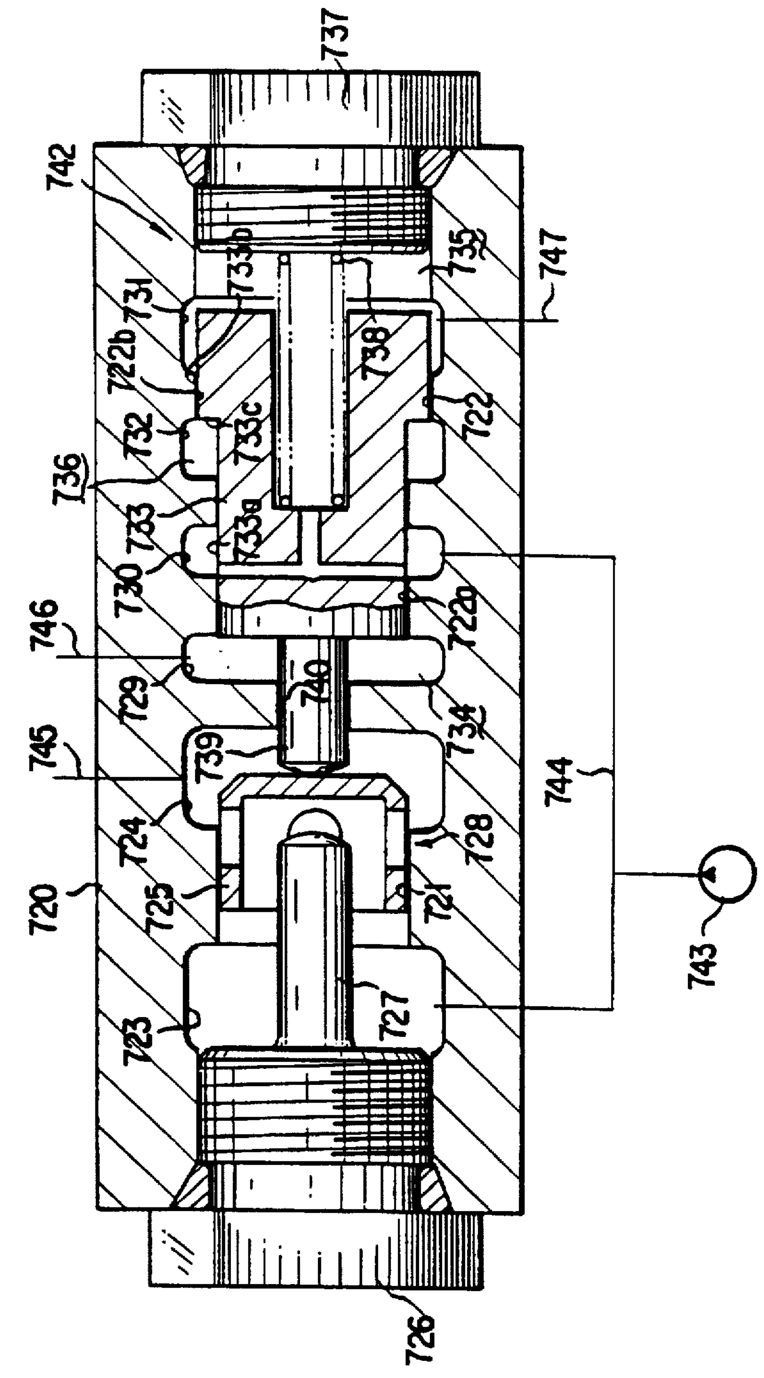

When the pump discharge pressure of the hydraulic pump 743 rises, the valve 725 is depressed toward the right as shown in FIG. 21 to establish communication between the inlet port 723 and the outlet port 725 to supply the pressurized fluid to the supply line 745 through the outlet port 725. When the valve is shifted to the stroke end, communication between the second port 730 and the third port 731 is established.

At the condition of FIG. 21, if the first control pressure at the first port 729 is higher than the second control pressure of the third port 731, the spool 733 is depressed toward the right to establish communication between the second port 730 and the third port 731 via the fluid passage 741. Thus, the pressure of the third port 731, namely the second control pressure, becomes the pressure level corresponding to the first control pressure. Therefore, the pump discharge pressure and the supply pressure in the supply line 745 become equal to each other.

At the condition of FIG. 21, if the second control pressure is higher than the first control pressure, the spool 733 is pushed toward the left to block communication between the second port 723 and the third port 731. Then, by the push rod 739, the valve 725 is depressed in the direction for blocking communication between the inlet port 723 and the outlet port 724 to reduce the open areas of the inlet port 723 and the outlet port 724 to make the pressure in the supply line 745 lower than the pump discharge pressure.

As set forth, when the first control pressure to be supplied to the first pressure chamber 734 of the pressure reduction valve portion 742 is higher than the second control pressure to be supplied to the second pressure chamber 735, the second port 730 and the third port 731 are communicated to lower the pump discharge pressure so that the pressure of the third port 731 (second control pressure) is equal to the pressure of the first port 729 (first control pressure). Also, the pressure at the inlet port 723 (pump discharge pressure) and the pressure at the outlet port (724) (supply pressure) become equal to each other. For instance, when the pump discharge pressure is 120 $kg/cm^2$ and the first control pressure is 100 $kg/cm^2$, the second control pressure becomes 100 $kg/cm^2$ and the supply pressure becomes 120 $kg/cm^2$.

Similarly, when the second control pressure is higher than the first control pressure, communication between the second port 730 and the third port 731 is not established so that the pump discharge pressure is not supplied to the third port 731. Also, by the valve 725, the open areas of the inlet port 723 and the outlet port 724 are reduced so that the supply pressure becomes lower than the pump discharge pressure in the extent corresponding to the pressure difference between the second control pressure and the first control pressure. For instance, when the pump discharge pressure is 120 $kg/cm^2$, the first control pressure is 10 $kg/cm^2$, and the second control pressure is 100 $kg/cm^2$, the supply pressure becomes 30 $kg/cm^2$.

As set forth above, in the hydraulic circuit which supplies discharged pressurized fluid from one hydraulic pump to a plurality of actuators, the supply line 745 is connected to the inlet port of the direction control valve. A load pressure of own actuator is introduced into the load pressure introduction line 746 to establish communication of the load detection lines 747 with respect to respective pressure compensation valves. Therefore, a pressurized fluid distribution comparable with the conventional system can be performed.

The foregoing discussion is given for the case where the switching valve 750 is not provided. When the switching valve 750 is placed at the first position to establish communication between the first port 729 and the fourth port 732, the spool 733 is depressed toward the right by the first control pressure acting on the third pressure receiving chamber 736. Thus, when the second control pressure is higher than the first control pressure, the spool 733 is depressed toward the left to push the valve 725 via the push rod 739 in the direction to block communication between the inlet port 723 and the outlet port 724. At this time, the pressure compensation characteristics, in which depression force is grown to be greater than that in the case set forth above, and thus, the supply pressure becomes lower than that discussed earlier, can be attained.

By switching the switching valve 750 in a second position B, the third port 731 communicates with the fourth port 732. Therefore, the same compensation characteristics as the above-mentioned description can be provided.

As set forth above, according to the present invention, when the pressure of the first pressure chamber 734 is higher than the pressure in the second pressure chamber 735, the spool 734 is shifted away from the valve 725 to make the pressure in the inlet port 723 and the pressure in the outlet port 724 become equal to each other. Also, the pressure in the first pressure chamber 734 and the pressure in the second pressure chamber 735 becomes equal to each other. When the pressure in the first pressure chamber 734 is lower than the pressure in the second pressure chamber 735, the valve 725 is depressed in the blocking direction by the spool 733 so that the pressure in the outlet port 724 becomes lower than the pressure in the inlet port 723 in the extent corresponding to the pressure difference between the second pressure chamber 735 and the first pressure chamber 734.

Accordingly, by providing the pressure compensation valve in the hydraulic circuit supplying the discharged pressurized fluid to a plurality of actuators, the discharged pressure of the hydraulic pump can be distributed at the controlled proportion to a plurality of actuators without employing the shuttle valve.

Also, force to depress the valve 725 in the direction to block communication between the inlet port 723 and the outlet port 724 by the spool 733 is differentiated between when the pressurized fluid in the first port 729 is supplied to the third pressure chamber 736, and when the pressurized fluid in the third port 731 is supplied to the third pressure chamber 736. Therefore, setting of the pressure compensation characteristics can be varied. For instance, for lifting up a boom of a power shovel, moderate pressure compensation characteristics may be selected and for lowering the boom, strict pressure compensation characteristics may be selected.

It should be noted that the construction of the pressure compensation valve may be the constructions disclosed in commonly owned, U.S. patent application Ser. No. 08/044,205, filed on Apr. 8, 1993, PCT International Application No. PCT/JP93/00452, filed on Apr. 8, 1993, PCT International Application No. PCT/JP93/00459, filed on Apr. 9, 1993, and PCT International Application No. PCT/JP93/00724, filed on May 28, 1993. The disclosure of the above-identified U.S. Patent Application and PCT International Applications are herein incorporated by reference.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments within a scope encompassed and equivalents thereof with respect to the features set out in the appended claims.

We claim:

1. A pressurized fluid supply system for supplying a discharged pressurized fluid of a hydraulic pump driven by an engine to a plurality of actuators via a pressure compensation valve and a direction switching valve, an unload valve being provided in a discharge line of said hydraulic pump, and said unload valve being biased in an unloading direction by a pump discharge pressure and in an on-load direction by a load pressure, comprising:

a cylinder operable in response to the load pressure is provided in a revolution speed control portion of the engine so that engine revolution speed is lowered when the load pressure is less than or equal to a set value.

2. A pressurized fluid supply system as set forth in claim 1, wherein a control lever of a fuel injection pump of the engine is connected to a second lever via a rod, said second lever being biased and pivoted in a direction for lowering the engine speed, and a piston rod of said cylinder is connected to said second lever, an expansion chamber of said cylinder being communicated with a load pressure detecting line.

3. A pressurized fluid supply system for supplying a discharged pressurized fluid of a hydraulic pump driven by an engine to a plurality of actuators via a pressure compensation valve and a direction switching valve, comprising:

an unload valve provided in a discharge line of said hydraulic pump, said unload valve being biased in an unloading direction by a pump discharge pressure and in an on-load direction by a load pressure in a load pressure line; and a cylinder provided in a revolution speed control portion of the engine, said cylinder being communicated with said load pressure line and being operable in response to the load pressure to lower a revolution speed of the engine when the load pressure is less than or equal to a set value.

4. A pressurized fluid supply system as set forth in claim 3, further comprising a lever provided in said revolution speed control portion of the engine, said lever being biased in a direction for lowering the revolution speed of the engine, said cylinder being operably connected with said lever.

* * * * *